US008176199B2

(12) United States Patent
Yamane

(10) Patent No.: US 8,176,199 B2
(45) Date of Patent: May 8, 2012

(54) CONTENT DELIVERY SYSTEM, COMMUNICATING APPARATUS, COMMUNICATING METHOD, AND PROGRAM

(75) Inventor: Kenji Yamane, Tokyo (JP)

(73) Assignee: Sony Corporation (JP)

( * ) Notice: Subject to any disclaimer, the term of this patent is extended or adjusted under 35 U.S.C. 154(b) by 1154 days.

(21) Appl. No.: 11/287,636

(22) Filed: Nov. 28, 2005

(65) Prior Publication Data
US 2006/0167987 A1 Jul. 27, 2006

(30) Foreign Application Priority Data
Nov. 29, 2004 (JP) .............................. P2004-344078

(51) Int. Cl.
*G06F 15/16* (2006.01)
(52) U.S. Cl. .................... 709/235; 709/217; 375/240
(58) Field of Classification Search .............. 709/235, 709/217; 375/240
See application file for complete search history.

(56) References Cited

U.S. PATENT DOCUMENTS

| 5,030,984 | A | * | 7/1991 | Buckler et al. ............... 396/153 |
| 5,666,161 | A | * | 9/1997 | Kohiyama et al. ........ 375/240.18 |
| 6,035,339 | A | * | 3/2000 | Agraharam et al. ........... 709/246 |
| 6,185,625 | B1 | * | 2/2001 | Tso et al. ...................... 709/247 |
| 6,614,936 | B1 | * | 9/2003 | Wu et al. ....................... 382/238 |
| 6,850,564 | B1 | * | 2/2005 | Pejhan et al. ............. 375/240.02 |
| 7,150,017 | B1 | * | 12/2006 | Vogl et al. ..................... 718/102 |
| 7,151,749 | B2 | * | 12/2006 | Vega-Garcia et al. ..... 370/241.1 |
| 7,558,198 | B2 | * | 7/2009 | Kane ............................. 370/230 |
| 2005/0193068 | A1 | * | 9/2005 | Brown et al. ................. 709/206 |

FOREIGN PATENT DOCUMENTS

| JP | 08317387 | A | 11/1996 |
| JP | 11-127150 | A | 5/1999 |
| JP | 2000134603 | A | 5/2000 |
| JP | 2000295272 | A | 10/2000 |
| JP | 2001175793 | A | 6/2001 |
| JP | 2002262288 | A | 9/2002 |
| JP | 2004180290 | A | 6/2004 |

OTHER PUBLICATIONS

Office Action from Japanese Application No. 2004-344078 dated Apr. 20, 2010.
Office Action from Japanese Application No. 2004-344078, dated Oct. 7, 2010.

\* cited by examiner

*Primary Examiner* — Krista Zele
*Assistant Examiner* — Andrew Georgandellis
(74) *Attorney, Agent, or Firm* — Lerner, David, Littenberg, Krumholz & Mentlik, LLP

(57) ABSTRACT

A content delivery system includes a client and a server, the client requesting deliveries of content from the server which transforms the content into layered-encoded data for transmission to the client over a network. The client includes: an inputting device inputting a time limit within which the content is to be delivered; a requesting device requesting a delivery of the content from the server within the time limit; and a receiving device receiving layered-encoded data constituting the content of which the delivery has been requested by the requesting device and which is transmitted from the server. The server includes: an acquiring device acquiring the time limit; a determining device determining the layered-encoded data constituting the content which can be transmitted to the client within the time limit, the determination being based on the time limit, on a bandwidth applicable to the client, and on size information about the layered-encoded data constituting the content which can be transmitted; and a transmitting device transmitting to the client the layered-encoded data determined by the determining device.

10 Claims, 19 Drawing Sheets

| | |
|---|---|
| SIZE OF DATA ENCODED IN UP TO THE FIRST LAYER | 10 MEGA-BITS |
| SIZE OF DATA ENCODED IN UP TO THE SECOND LAYER | 20 MEGA-BITS |
| SIZE OF DATA ENCODED IN UP TO THE THIRD LAYER | 30 MEGA-BITS |
| SIZE OF DATA ENCODED IN UP TO THE FOURTH LAYER | 40 MEGA-BITS |

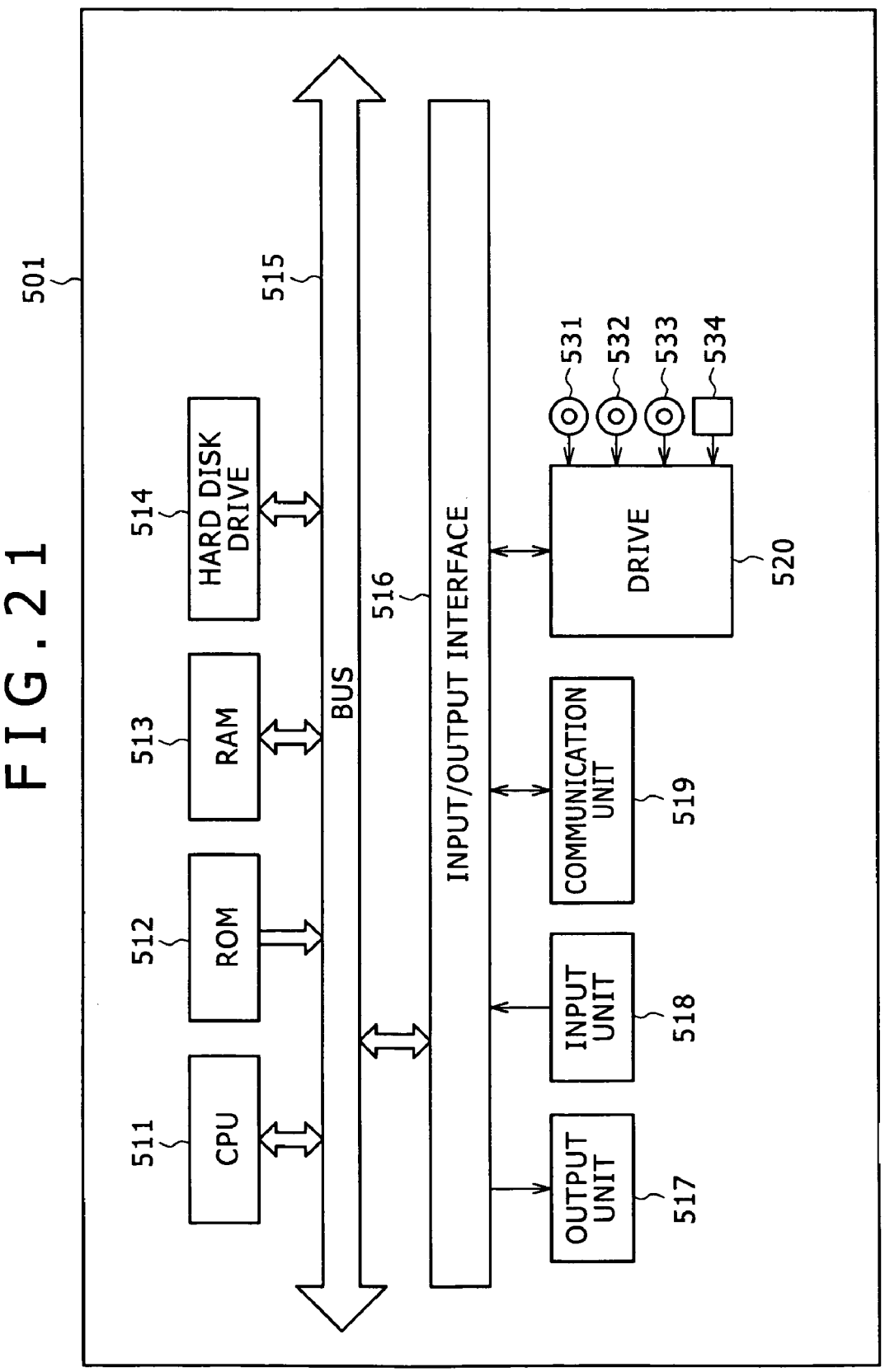

CONTENT DELIVERY SYSTEM, COMMUNICATING APPARATUS, COMMUNICATING METHOD, AND PROGRAM

CROSS-REFERENCES TO RELATED APPLICATIONS

The present invention contains subject matter related to Japanese Patent Application 2004-344078 filed with the Japanese Patent Office on Nov. 29, 2004, the entire contents of which being incorporated herein by reference.

BACKGROUND OF THE INVENTION

The present invention relates to a content delivery system, a communicating apparatus, a communicating method, and a program. More particularly, the invention relates to a content delivery system, a communicating apparatus, a communicating method, and a program for delivering content within a user-designated time limit.

In recent years, it has become very popular to deliver content including picture data over the Internet to such communication terminals as PC's (Personal Computers), PDA's (Personal Digital Assistants) and mobile phones or the like. The content to be delivered is compressed illustratively using the MPEG (Moving Pictures Experts Group) standard into MPEG streams of data for transfer over the network in accordance with IP (Internet Protocol).

There are a number of methods for delivering data over the network. One such method is download delivery that involves having communication terminals store temporarily the delivered content before reproduction. Another method is the streaming of data such as video-on-demand and live video delivery. Yet another method is real-time communication practiced illustratively in the form of videoconferences and videophones. Implementing any of these methods requires taking into account the fact that the capability of the receiving side to receive what is delivered varies from one terminal to another.

Typically, the mobile phone has a low-resolution display device and a low-performance CPU (Central Processing Unit). The desktop personal computer is equipped with a high-resolution monitor and a high-performance CPU. Both of them with their varying capabilities serve as a terminal for receiving information transmitted by a given source.

One proposed way of getting such receiving terminals to carry out data receiving and displaying processes in keeping with their processing capabilities involves having data encoded in a layered fashion for transmission and reception. Specifically, the target data is layered-encoded by an appropriate communication system in ways that comply with the varied processing ability of diverse kinds of receiving terminals.

The layered-encoded data is packetized illustratively in two distinctly recognizable formats for delivery. In one format, the data is encoded for processing solely by receiving terminals with a high-resolution display device. In another format, the data is encoded so as to be handled by receiving terminal having either a high-resolution or a low-resolution display device. The receiving side selects the data packet form that suits its processing capability.

The above communication system, discussed illustratively in Japanese Patent Laid-open No. Hei 14-262288, allows receiving terminals located in an area of poor transmission status to use the data delivered in a reduced data size for lowered resolution, while enabling terminals in areas of good transmission status to handle data delivered in a large data size for enhanced resolution, the data delivery originating from a single data file.

The compressing and expanding methods capable of layered encoding illustratively include video streaming by the MPEG-4 or JPEG 2000 standard. According to the MPEG-4 standard, data is profiled by so-called Fine Granularity Scalability, a layered encoding technique for delivering data in scalable fashion at low to high bit rates. The JPEG 2000 standard takes advantage of the characteristics of wavelet transform adopted as its basis when getting data layered-encoded into packets with emphasis on spatial resolution or on picture quality. JPEG 2000 includes the Motion JPEG 2000 (Part 3) standard covering moving pictures as well, the latter standard allowing layered-encoded moving picture data to be stored in file format.

Whereas the related art includes techniques such as that disclosed in the above-cited patent application for delivering data at an optimum rate based on the resolution and bandwidth of the receiving terminal, no techniques have been proposed which would enable content to be delivered within a user-designated time limit.

There exist techniques, such as one disclosed in Japanese Patent Laid-open No. 2004-88501, which present users with predicted communication charges and download times preparatory to a decision on one of a plurality of communication services available for connection and content delivery. However, this type of technique merely involves prompting the user to reference the presented information before determining the suitable communication service to be used. Content cannot be arranged to be delivered within the time limit established by the user.

SUMMARY OF THE INVENTION

As described, the related art is found incapable of delivering content within the user-designated time limit.

The present invention has been made in view of the above circumstances and provides arrangements for enabling content to be delivered within predetermined time limits.

According to one embodiment of the present invention, there is provided a content delivery system including a client and a server, the client requesting deliveries of content from the server which transforms the content into layered-encoded data for transmission to the client over a network: wherein the client includes an inputting device inputting a time limit within which the content is to be delivered; a requesting device requesting a delivery of the content from the server within the time limit; and a receiving device receiving layered-encoded data constituting the content of which the delivery has been requested by the requesting device and which is transmitted from the server; and wherein the server includes an acquiring device acquiring the time limit; a determining device determining the layered-encoded data constituting the content which can be transmitted to the client within the time limit, the determination being based on the time limit, on a bandwidth applicable to the client, and on size information about the layered-encoded data constituting the content which can be transmitted; and a transmitting device transmitting to the client the layered-encoded data determined by the determining device.

In one preferred structure of the inventive content delivery system, the determining device may determine a layer up to which the content is encoded in for data transmission based on the time limit, the bandwidth, and the size information; and the transmitting device may transmit the data encoded in up to the layer determined by the determining device, to the client at a predetermined frame rate.

In another preferred structure of the inventive content delivery system, the determining device may determine a frame rate for data transmission based on the time limit, the bandwidth, and the size information; and the transmitting device may transmit the data encoded in up to a predetermined layer to the client at the frame rate determined by the determining device.

According to another embodiment of the present invention, there is provided a first communicating apparatus for requesting deliveries of content constituted by layered-encoded data from a server over a network, the first communicating apparatus including: an inputting device inputting a time limit within which the content is to be delivered; a requesting device requesting a delivery of the content from the server within the time limit; and a receiving device receiving the layered-encoded data constituting the content of which the delivery has been requested by the requesting device and which is transmitted from the server.

In one preferred structure of the first communicating apparatus of the invention, the server may deliver the content as the layered-encoded data which can be transmitted to the client within the time limit over a bandwidth applicable to the communicating apparatus; and the first communicating apparatus may further include a setting device setting the bandwidth; and a notifying device notifying the server of the bandwidth set by the setting device.

According to a further embodiment of the present invention, there is provided a first communicating method for requesting deliveries of content constituted by layered-encoded data from a server over a network, the first communicating method including the steps of: inputting a time limit within which the content is to be delivered; requesting a delivery of the content from the server within the time limit; and receiving the layered-encoded data constituting the content of which the delivery has been requested in the requesting step and which is transmitted from the server.

According to an even further embodiment of the present invention, there is provided a first program carried out by a processor for controlling a communicating apparatus requesting deliveries of content constituted by layered-encoded data from a server over a network, the first program including the steps of: inputting a time limit within which the content is to be delivered; requesting a delivery of the content from the server within the time limit; and receiving the layered-encoded data constituting the content of which the delivery has been requested in the requesting step and which is transmitted from the server.

Where the first communicating apparatus, first communicating method, and first program of the present invention are in use, a time limit within which the content is to be delivered is input. A delivery of the content within the time limit is requested from the server. What is then received is the layered-encoded data constituting the content of which the delivery has been requested and which is transmitted from the server.

According to a still further embodiment of the present invention, there is provided a second communicating apparatus for transmitting content as layered-encoded data to a client over a network, the second communicating apparatus including: an acquiring device which, if the client requests a delivery of content within a time limit, then acquires the time limit; a determining device determining the layered-encoded data constituting the content which can be transmitted to the client within the time limit, the determination being based on the time limit, on a bandwidth applicable to the client, and on size information about the layered-encoded data constituting the content which can be transmitted; and a transmitting device transmitting to the client the layered-encoded data determined by the determining device.

One preferred structure of the second communicating apparatus of the invention may further include: a content holding device holding the layered-encoded data constituting the content which can be transmitted; and a size information holding device holding the size information.

In another preferred structure of the second communicating apparatus of the invention, the determining device may determine a layer up to which the content is encoded in for data transmission based on the time limit, the size information, and the bandwidth; and the transmitting device may transmit the data encoded in up to the layer determined by the determining device, to the client at a predetermined frame rate.

In a further preferred structure of the second communicating apparatus of the invention, the determining device may determine a frame rate for data transmission based on the time limit, the size information, and the bandwidth; and the transmitting device may transmit the data encoded in up to a predetermined layer to the client at the frame rate determined by the determining device.

In an even further preferred structure of the second communicating apparatus of the invention, the determining device may determine a layer up to which the content is encoded in and a frame rate at which the encoded data is transmitted, based on the time limit, the size information, and the bandwidth; and the transmitting device may transmit the data encoded in up to the layer determined by the determining device, to the client at the frame rate determined by the determining device.

A still further preferred structure of the second communicating apparatus of the invention may further include a priority information acquiring device acquiring priority information indicating whether priority is on picture quality or on frame rate; wherein, if the priority information indicates that priority is on picture quality, then the determining device may determine the highest possible layer up to which the content can be encoded in and a frame rate at which the encoded data is transmitted; and wherein, if the priority information indicates that priority is on frame rate, then the determining device may determine a layer up to which the content is encoded in and the highest possible frame rate at which the encoded data can be transmitted.

In a yet further preferred structure of the second communicating apparatus of the invention, the priority information acquiring device may acquire the priority information from a priority information generating apparatus including: a calculating device calculating an amount of change in luminance in the content; and a generating device generating the priority information based on the amount of change in luminance calculated by the calculating device.

Another preferred structure of the second communicating apparatus of the invention may further include a bandwidth storing device storing the bandwidth; wherein the determining device may determine the layered-encoded data constituting the content which can be transmitted to the client within the time limit, the determination being based on the time limit acquired by the acquiring device, on the bandwidth stored by the storing device, and on the size information held by the size information holding device.

A further preferred structure of the second communicating apparatus of the invention may further include a measuring device measuring the bandwidth; wherein the bandwidth storing device may store the bandwidth measured by the measuring device.

In an even further preferred structure of the second communicating apparatus of the invention, the client may further include: a setting device setting the bandwidth; and a notifying device notifying the communicating apparatus of the bandwidth set by the setting device; and the bandwidth storing device may store the bandwidth provided by the notifying device.

According to a yet further embodiment of the present invention, there is provided a second communicating method for transmitting content as layered-encoded data to a client over a network, the second communicating method including the steps of: acquiring the time limit, if the client requests a delivery of content within a time limit; determining the layered-encoded data constituting the content which can be transmitted to the client within the time limit, the determination being based on the time limit, on a bandwidth applicable to the client, and on size information about the layered-encoded data constituting the content which can be transmitted; and transmitting to the client the encoded data determined in the determining step.

According to another embodiment of the present invention, there is provided a second program carried out by a processor for controlling a communicating apparatus transmitting content as layered-encoded data to a client over a network, the second program including the steps of: acquiring the time limit, if the client requests a delivery of content within a time limit; determining the layered-encoded data constituting the content which can be transmitted to the client within the time limit, the determination being based on the time limit, on a bandwidth applicable to the client, and on size information about the layered-encoded data constituting the content which can be transmitted; and transmitting to the client the layered-encoded data determined in the determining step.

Where the second communicating apparatus, second communicating method, and second program of the present invention are in use, if the client requests a delivery of content within a time limit, that time limit is acquired. What is then determined is the layered-encoded data constituting the content which can be transmitted to the client within the time limit. The determination of the layered-encoded data is based on the time limit, on a bandwidth applicable to the client, and on size information about the encoded data constituting the content which can be transmitted. The layered-encoded data thus determined is transmitted to the client.

A major benefit of the present invention is that content can be delivered within a designated time limit.

BRIEF DESCRIPTION OF THE DRAWINGS

Further objects and advantages of the present invention will become apparent upon a reading of the following description and appended drawings in which:

FIG. 21 is a block diagram showing a typical structure of a computer 501.

DETAILED DESCRIPTION

Figure 1:
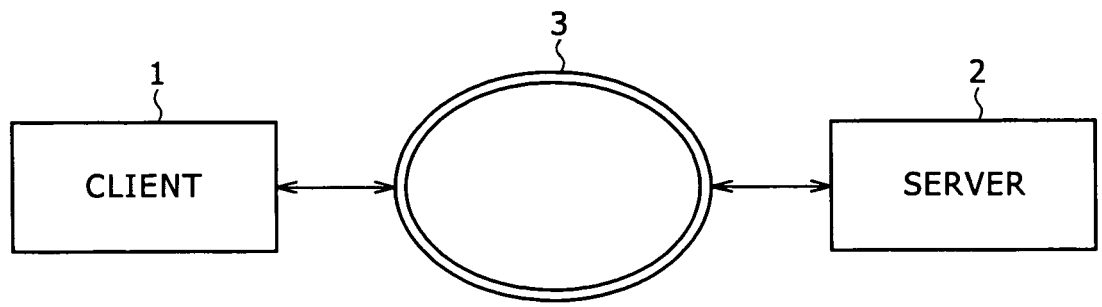
FIG. 1 is a schematic view showing a typical configuration of a content delivery system embodying the present invention.

What is described below as the preferred embodiments of the present invention corresponds to the appended claims as follows: the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention described hereunder has a specifically corresponding claim, this does not mean that the example in question is limited to that claim or has no relevance to other claims.

Furthermore, the description below of the preferred embodiments does not claim to include all examples corresponding to the whole claims. In other words, the description hereunder does not limit or deny any inventive entities which are not covered by the appended claims of the present invention but which may be added or brought about by this applicant in the future by divisional application or by amendment.

One embodiment of the present invention is a content delivery system including a client and a server. The client requests deliveries of content from the server which transforms the content into layered-encoded data for transmission to the client over a network. The client includes: an inputting device (e.g., input unit 11 in FIG. 2) inputting a time limit within which the content is to be delivered; a requesting device (e.g., control unit 12 in FIG. 2) requesting a delivery of the content from the server within the time limit; and a receiving device (e.g., communication unit 14 in FIG. 2) receiving the layered-encoded data constituting the content of which the delivery has been requested by the requesting device and which is transmitted from the server. The server includes: an acquiring device (e.g., determination unit 22 in FIG. 3)

acquiring the time limit; a determining device (e.g., determination unit 22 in FIG. 3) determining the layered-encoded data constituting the content which can be transmitted to the client within the time limit, the determination being based on the time limit, on a bandwidth applicable to the client, and on size information about the layered-encoded data constituting the content which can be transmitted; and a transmitting device (e.g., transcoder 27 in FIG. 3) transmitting to the client the layered-encoded data determined by the determining device.

In one preferred structure of the content delivery system above, the determining device (e.g., determination unit 22 in FIG. 3) may determine a layer up to which the content is encoded in for data transmission based on the time limit, the bandwidth, and the size information; and the transmitting device (e.g., transcoder 27 in FIG. 3) may transmit the data encoded in up to the layer determined by the determining device, to the client at a predetermined frame rate.

In another preferred structure of the content delivery system above, the determining device (e.g., determination unit 51 in FIG. 9) may determine a frame rate for data transmission based on the time limit, the bandwidth, and the size information; and the transmitting device (e.g., transcoder 52 in FIG. 9) may transmit the data encoded in up to a predetermined layer to the client at the frame rate determined by the determining device.

Another embodiment of the present invention is a communicating apparatus for requesting deliveries of content constituted by layered-encoded data from a server over a network. The communicating apparatus includes: an inputting device (e.g., input unit 11 in FIG. 2) inputting a time limit within which the content is to be delivered; a requesting device (e.g., control unit 12 in FIG. 2) requesting a delivery of the content from the server within the time limit; and a receiving device (e.g., communication unit 14 in FIG. 2) receiving the layered-encoded data constituting the content of which the delivery has been requested by the requesting device and which is transmitted from the server.

In one preferred structure of the communicating apparatus above, the server may deliver the content as the layered-encoded data which can be transmitted to the client within the time limit over a bandwidth applicable to the communicating apparatus; and the communicating apparatus may further include: a setting device (e.g., operation unit of the client in FIG. 2) setting the bandwidth; and a notifying device (e.g., communication unit 14 in FIG. 2) notifying the server of the bandwidth set by the setting device.

A further and an even further embodiment of the present invention are a communicating method and a program for requesting deliveries of content constituted by layered-encoded data from a server over a network. The communicating method and program each include the steps of: inputting (e.g., by the input unit 11 in FIG. 2) a time limit within which the content is to be delivered; requesting (e.g., by the control unit 12 in FIG. 2) a delivery of the content from the server within the time limit; and receiving (e.g., by the communication unit 14 in FIG. 2) the layered-encoded data constituting the content of which the delivery has been requested in the requesting step and which is transmitted from the server.

A still further embodiment of the present invention is a communicating apparatus for transmitting content as layered-encoded data to a client over a network. The communicating apparatus includes: an acquiring device (e.g., determination unit 22 in FIG. 3) which, if the client requests a delivery of content within a time limit, then acquires the time limit; a determining device (e.g., determination unit 22 in FIG. 3) determining the layered-encoded data constituting the content which can be transmitted to the client within the time limit, the determination being based on the time limit, on a bandwidth applicable to the client, and on size information about the layered-encoded data constituting the content which can be transmitted; and a transmitting device (e.g., transcoder 27 in FIG. 3) transmitting to the client the layered-encoded data determined by the determining device.

One preferred structure of the communicating apparatus above may further include: a content holding device (e.g., content holding unit 26 in FIG. 3) holding the layered-encoded data constituting the content which can be transmitted; and a size information holding device (e.g., layer size information holding unit 25 in FIG. 3) holding the size information.

In another preferred structure of the communicating apparatus above, the determining device (e.g., determination unit 22 in FIG. 3) may determine a layer up to which the content is encoded in for data transmission based on the time limit, the size information, and the bandwidth; and the transmitting device (e.g., transcoder 27 in FIG. 3) may transmit the data encoded in up to the layer determined by the determining device, to the client at a predetermined frame rate.

In a further preferred structure of the communicating apparatus above, the determining device (e.g., determination unit 51 in FIG. 9) may determine a frame rate for data transmission based on the time limit, the size information, and the bandwidth; and the transmitting device (e.g., transcoder 52 in FIG. 9) may transmit the data encoded in up to a predetermined layer to the client at the frame rate determined by the determining device.

In an even further preferred structure of the communicating apparatus above, the determining device (e.g., determination unit 61 in FIG. 13) may determine a layer up to which the content is encoded in and a frame rate at which the encoded data is transmitted, based on the time limit, the size information, and the bandwidth; and the transmitting device (e.g., transcoder 62 in FIG. 13) may transmit the data encoded in up to the layer determined by the determining device, to the client at the frame rate determined by the determining device.

A still further preferred structure of the communicating apparatus above may further include a priority information acquiring device (e.g., determination unit 61 in FIG. 13) acquiring priority information indicating whether priority is on picture quality or on frame rate; wherein, if the priority information indicates that priority is on picture quality, then the determining device (determination unit 61 in FIG. 13) may determine the highest possible layer up to which the content can be encoded in and a frame rate at which the encoded data is transmitted; and wherein, if the priority information indicates that priority is on frame rate, then the determining device (determination unit 61 in FIG. 13) may determine a layer up to which the content is encoded in and the highest possible frame rate at which the encoded data can be transmitted.

Figure 18:
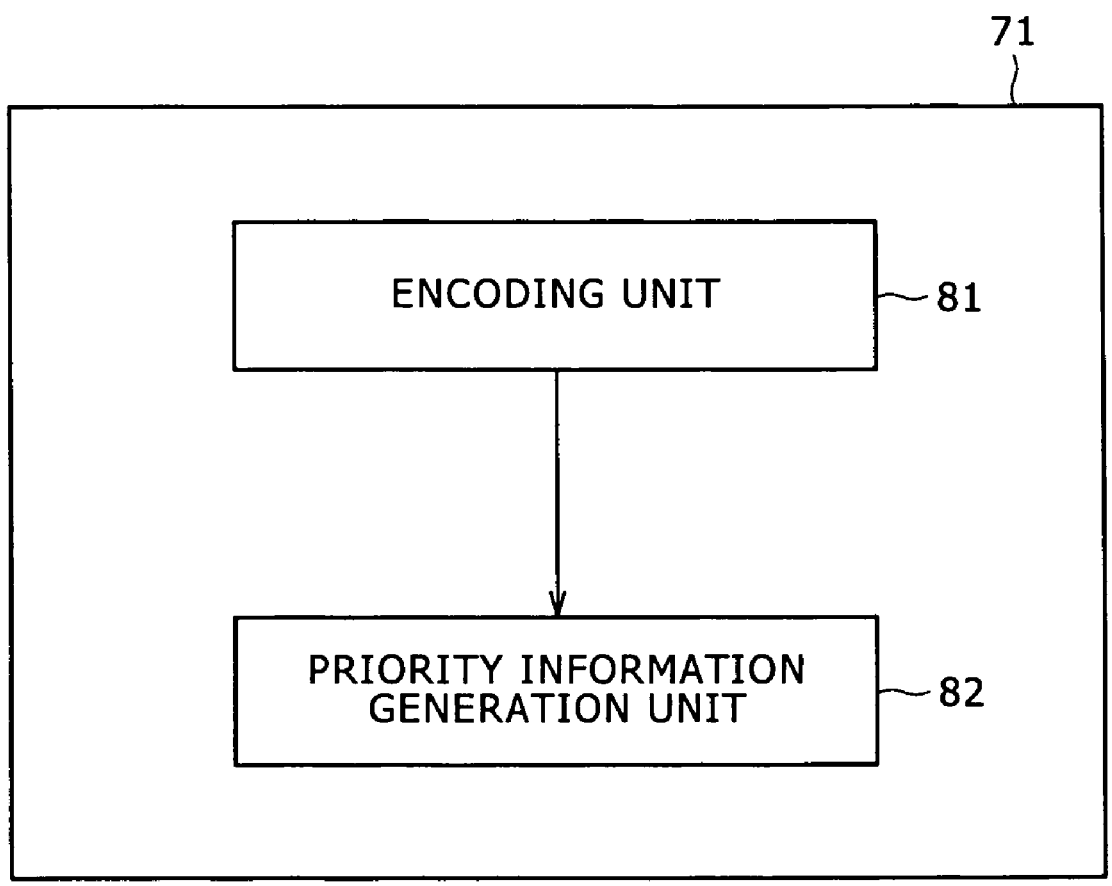
FIG. 18 is a block diagram showing a typical structure of an encoder 71 generating priority information.

In a yet further preferred structure of the communicating apparatus above, the priority information acquiring device may acquire the priority information from a priority information generating apparatus (e.g., encoder 71 in FIG. 18) including: a calculating device (e.g., encoding unit 81 in FIG. 18) calculating an amount of change in luminance in the content; and a generating device (e.g., priority information generation unit 82 in FIG. 18) generating the priority information based on the amount of change in luminance calculated by the calculating device.

Another preferred structure of the communicating apparatus above may further include a bandwidth storing device (e.g., bandwidth holding unit 24 in FIG. 3) storing the bandwidth; wherein the determining device (e.g., determination unit 22 in FIG. 3) may determine the layered-encoded data constituting the content which can be transmitted to the client within the time limit, the determination being based on the time limit acquired by the acquiring device, on the bandwidth stored by the storing device, and on the size information held by the size information holding device.

A further preferred structure of the communicating apparatus above may further include a measuring device (e.g., determination unit 22 in FIG. 3) measuring the bandwidth; wherein the bandwidth storing device may store the bandwidth measured by the measuring device.

In an even further preferred structure of the communicating apparatus above, the client may further include: a setting device setting the bandwidth; and a notifying device notifying the communicating apparatus of the bandwidth set by the setting device; and the bandwidth storing device (e.g., bandwidth holding unit 24 in FIG. 3) may store the bandwidth provided by the notifying device.

A yet further and another embodiment of the present invention are a communicating method and a program for transmitting content as layered-encoded data to a client over a network. The communicating method and program each include the steps of: acquiring the time limit (e.g., in step S3 of FIG. 5), if the client requests a delivery of content within a time limit; determining the layered-encoded data constituting the content which can be transmitted to the client within the time limit (e.g., in step S4 of FIG. 5), the determination being based on the time limit, on a bandwidth applicable to the client, and on size information about the layered-encoded data constituting the content which can be transmitted; and transmitting to the client the layered-encoded data determined in the determining step (e.g., in step S5 of FIG. 5).

FIG. 1 is a schematic view showing a typical configuration of a content delivery system embodying the present invention.

The system is constituted by a client 1 and a server 2 exchanging content (including moving picture data) over a packet switched network 3 such as the Internet.

By operating the client 1, the user may designate desired content to be delivered, and a time limit for the delivery. That is, the user can specify in how many minutes or seconds the delivery should be carried out or up to what time the delivery should be completed.

When the user specifies the content to be delivered and the time limit for the delivery, the client 1 requests the delivery of the specified content from the server 2 over the packet switched network 3.

The client 1 receives the content as encoded data sent from the server 2 in response to the request. The received content is reproduced illustratively for output onto a display device and/or through speakers, not shown.

The server 2 holds one or more items of content as encoded data for delivery to the client 1. The content is layered-encoded in accordance with the MPEG-4 or JPEG 2.000 standard.

In this example, the content to be delivered to the client 1 is encoded in up to four layers representative of four different picture quality levels. The server 2 holds each item of content in the form of data encoded in the four layers.

In the description that follows, it is assumed that the lowest picture quality (i.e., the coarsest picture quality) is provided by data encoded in a first layer; the second-lowest picture quality by data encoded in a second layer; the second-highest picture quality by data encoded in a third layer; and the highest picture quality (i.e., the finest picture quality) by data encoded in a fourth layer.

Upon receipt of a request for a content delivery subject to a time limit from the client 1, the server 2 sends to the client 1 an appropriate amount of encoded data that can be transmitted within the time limit.

As will be discussed later in more detail, given the time limit, the server 2 determines accordingly one of the four layers (i.e., the first through the fourth layers) up to which data is to be encoded in for transmission: data encoded in up to the first layer, data encoded in up to the second layer (i.e., data encoded in the first and the second layers), data encoded in up to the third layer (i.e., data encoded in the first, the second, and the third layers), and data encoded in up to the fourth layer (i.e., data encoded in the first, the second, the third, and the fourth layers). The data encoded in up to the layer thus determined is transmitted to the client 1. In this example, a fixed frame rate of 30 fps is adopted.

Figure 2:
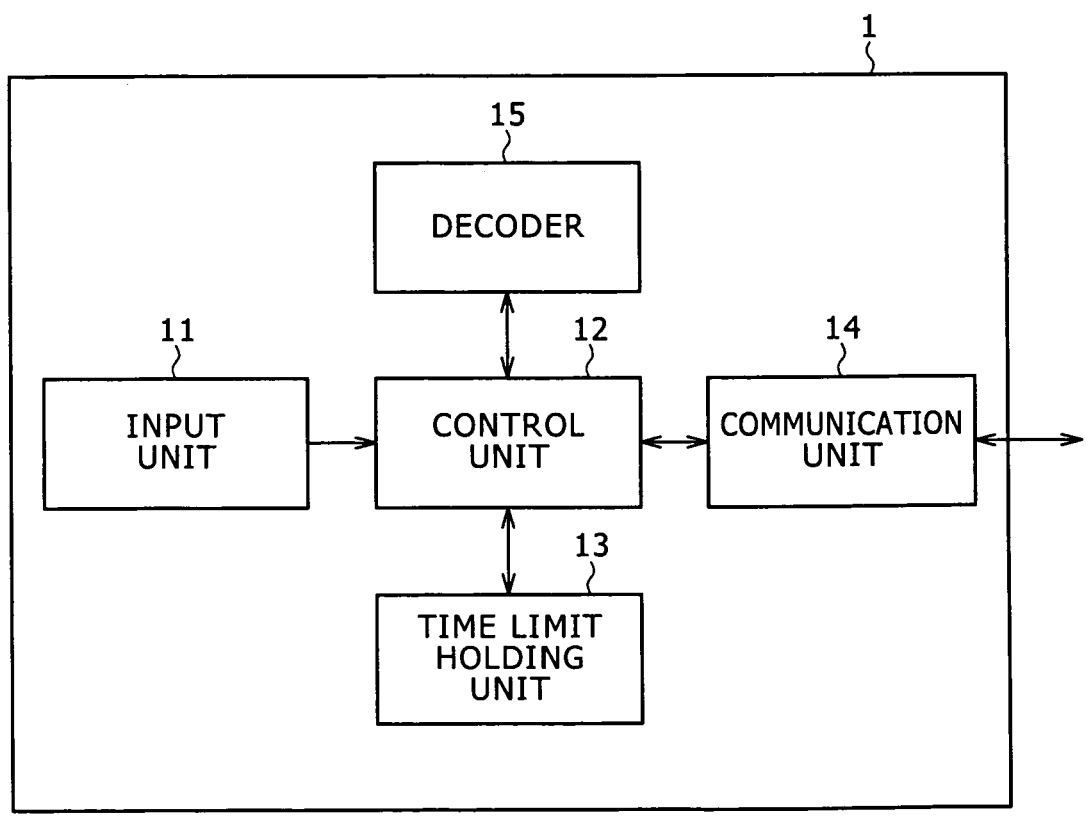
FIG. 2 is a block diagram showing a typical structure of a client 1 in FIG. 1.

FIG. 2 is a block diagram showing a typical structure of the client 1.

An input unit 11 shown in FIG. 2 inputs the designation of a delivery of content together with a time limit from the user's operation unit, not shown, and supplies what has been input to a control unit 12.

When supplied with the designation of the content to be delivered together with its time limit from the input unit 11, the control unit 12 stores the time limit into a time limit holding unit 13. At the same time, the control unit 12 requests the server 2 via a communication unit 14 to deliver the designated content within the designated time limit.

Furthermore, the control unit 12 causes a decoder 15 to decode the content (of which the delivery was requested) sent from the server 2 and received by the communication unit 14. The decoded content is output illustratively onto the display device and/or through speakers, not shown.

The communication unit 14 is connected to the packet switched network 3. In operation, the communication unit 14 controls communications of the client 1 with the server 2.

Figure 3:
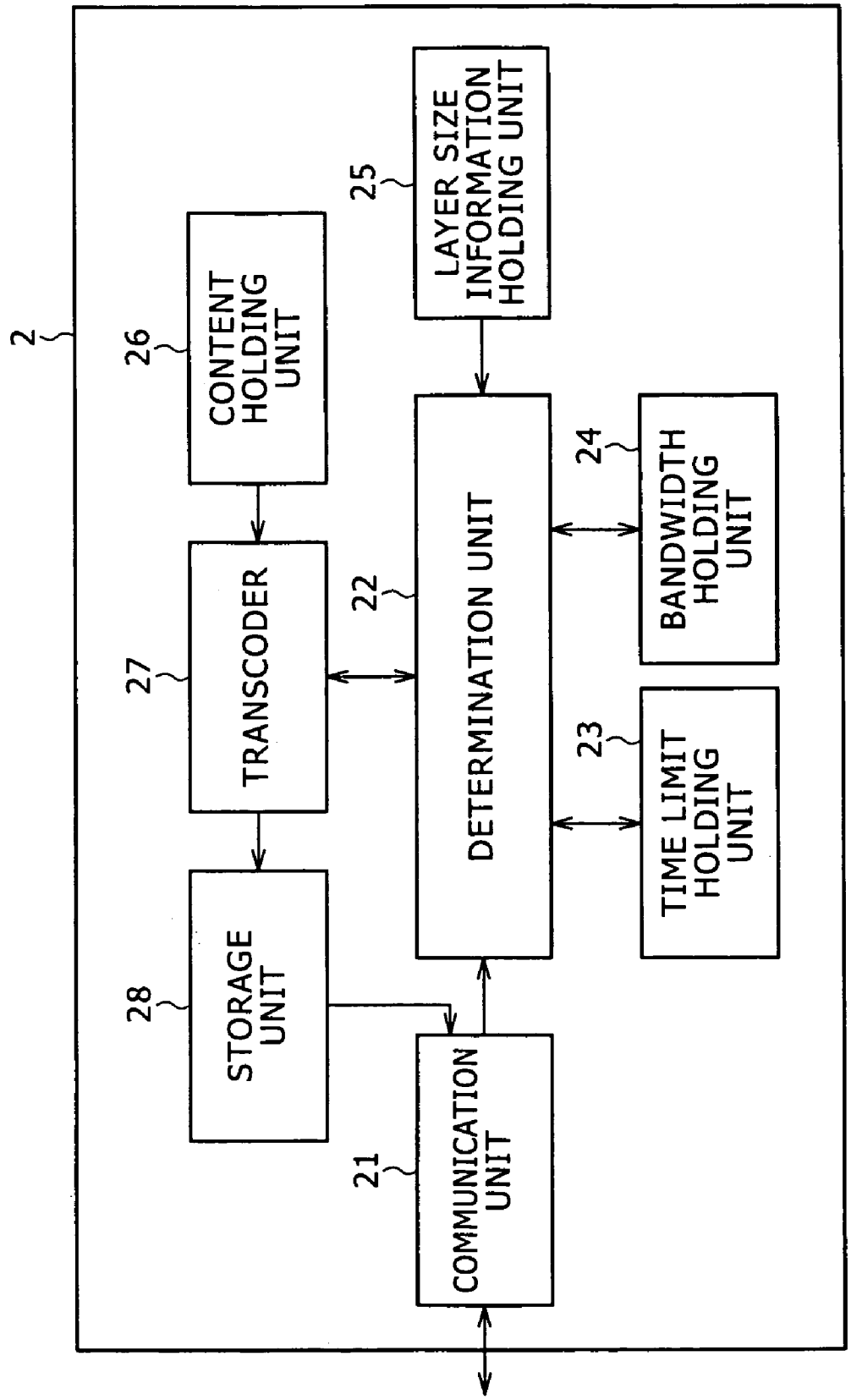
FIG. 3 is a block diagram showing a typical structure of a server 2 in FIG. 1.

FIG. 3 is a block diagram showing a typical structure of the server 2.

A communication unit 21 shown in FIG. 3 conducts communications with the client 1 over the packet switched network 3. Illustratively, the communication unit 21 receives a request for delivery of content subject to a time limit from the client 1. The received request is forwarded to a determination unit 22.

Furthermore, the communication unit 21 retrieves from a storage unit 28 a content file corresponding to the request received from the client 1. The retrieved file is transferred from the communication unit 21 to the client 1.

On receiving the request for delivery of the content together with its time limit, the determination unit 22 stores the time limit into a time limit holding unit 23. At the same time, the determination unit 22 determines the layer up to which the content data is encoded in for transmission, the determination being based on the time limit, on bandwidth data held in a bandwidth holding unit 24 with respect to the client 1, and on layer size information held in a layer size information holding unit 25 regarding the content of which the delivery has been requested. The layer thus determined is signaled to a transcoder 27.

The bandwidth holding unit 24 holds bandwidth data applicable to the client 1 and the server 2. The bandwidth is measured illustratively by the determination unit 22 and client 1 working in collaboration.

The layer size information holding unit 25 holds size information about the data encoded in multiple layers (i.e., called layer size information) constituting the content (held in a content holding unit 26) that may be transmitted to the client 1.

In this example, each item of content is associated with the layer size information about the applicable content data ended in up to four layers: data encoded in up to the first layer, data encoded in up to the second layer (i.e., data encoded in the first and the second layers), data encoded in up to the third layer (i.e., data encoded in the first, the second, and the third layers), and data encoded in up to the fourth layer (i.e., data encoded in the first, the second, the third, and the fourth layers). All layered-encoded content data is transmitted at the frame rate of 30 fps.

Figures 4, 5:
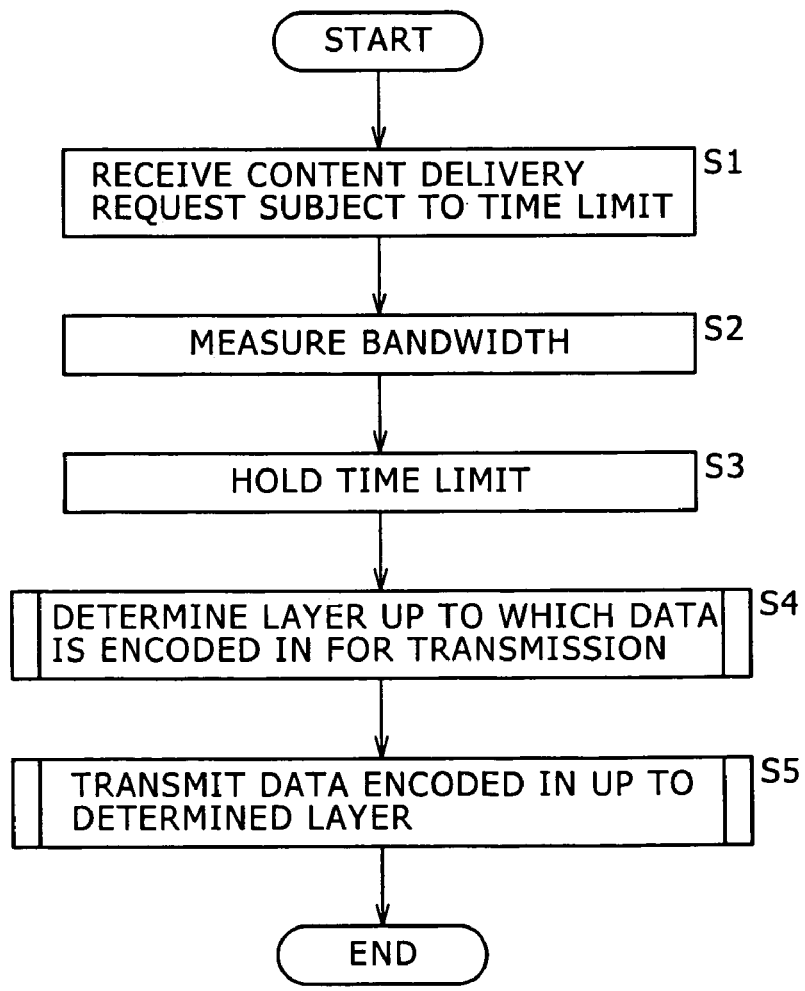
FIG. 4 is a tabular view showing typical size information about layered-encoded data.
FIG. 5 is a flowchart of steps performed by the server 2 in FIG. 1.

FIG. 4 is a tabular view listing typical layer size information about layered-encoded content data. The layer size information shows that the content data amounts to 10 mega-bits, 20 mega-bits, 30 mega-bits, and 40 mega-bits when encoded in up to the first, the second, the third, and the fourth layers respectively for transmission at the frame rate of 30 fps.

Returning to FIG. 3, the content holding unit 26 holds files of one or a plurality of items of content to be delivered as layered-encoded data to the client 1, each file representing one of the four data sets of each content item encoded in up to the first, the second, the third and the fourth layers.

Based on what is determined by the determination unit 22, the transcoder 27 retrieves from the content holding unit 26 the layered-encoded data constituting the content to be delivered, and stores the retrieved data as a single file in the storage unit 28.

How the server 2 works will now be described with reference to the flowchart of FIG. 5.

In step S1 of FIG. 5, the communication unit 21 of the server 2 receives from the client 1 a request for delivery of content subject to a time limit. In step S2, the determination unit 22 measures the bandwidth applicable to the client 1. The process of step 2 is carried out in collaboration with the client 1 (e.g., with the control unit 12).

More specifically, the determination unit 22 of the server 2 transfers two packets of an identical size on a back-to-back basis to the client 1 via the communication unit 21. The client 1 receives the transmitted packets.

Figure 6:
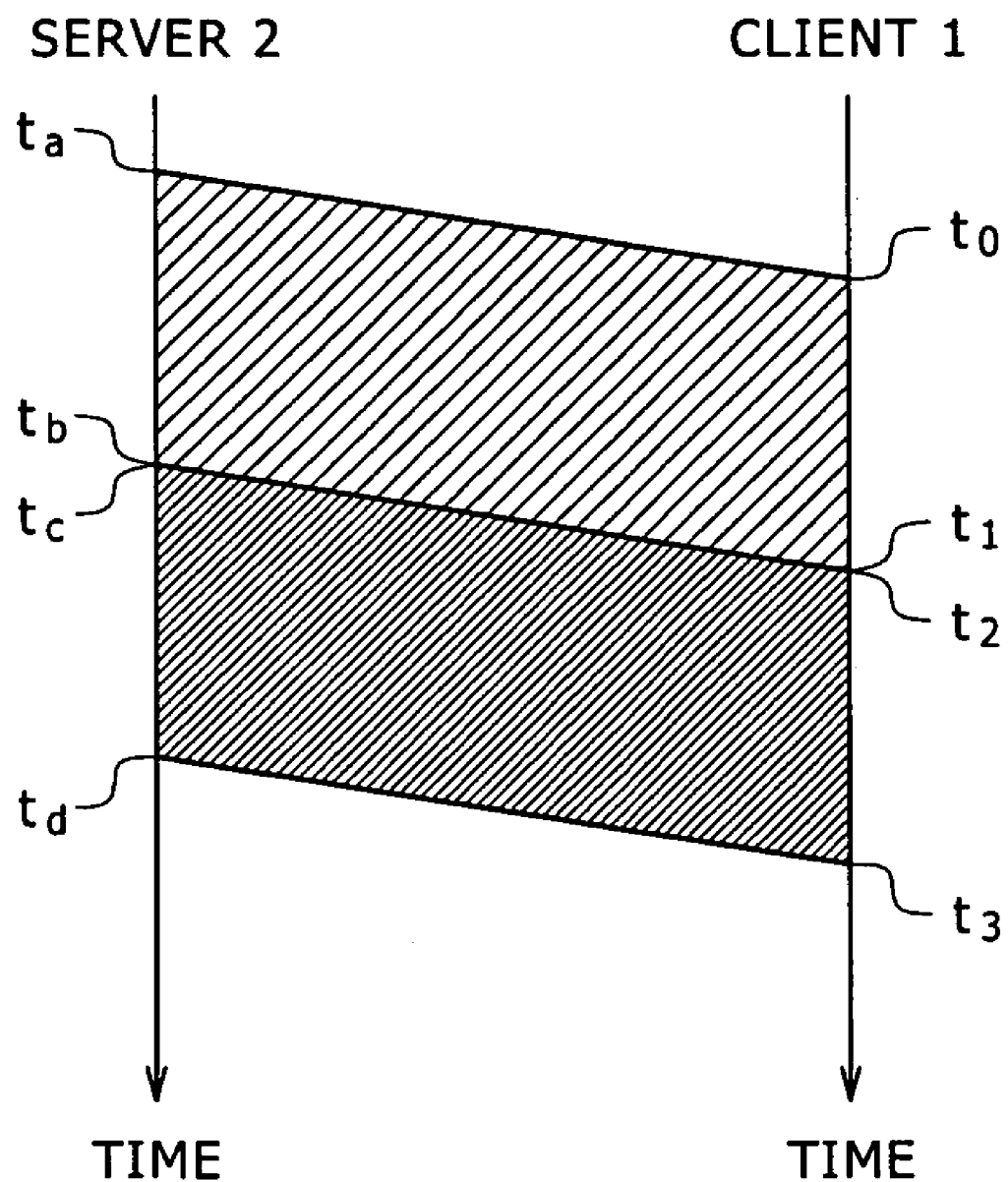
FIG. 6 is a schematic view explaining how step S2 of FIG. 5 is performed.

FIG. 6 illustrates how time typically passes when two packets are transmitted from the server 2 to the client 1. Time advances in the downward direction in FIG. 6. At time ta in FIG. 6, the server 2 starts transmitting the first packet and completes the transmission at time tb. Immediately afterward (i.e., at time tc), the server 2 starts sending the second packet and completes the transmission at time td. The client 1 starts receiving the first packet at time t0 and completes the reception at time t1. Immediately afterward (i.e., at time t2), the client 1 starts receiving the second packet and completes the reception at time t3.

Given the times t1 and t3 at which the reception of the two packets was completed as well as a size S of the packets, the client 1 calculates the bandwidth in effect using the following expression (1):

$$\text{bandwidth} = S/(t3-t1) \qquad (1)$$

The bandwidth thus calculated is signaled to the server 2.

The determination unit 22 of the server 2 receives the bandwidth data from the client 1, and places the received bandwidth data into the bandwidth holding unit 24.

In step S3 back in FIG. 5, the determination unit 22 of the server 2 acquires the time limit for delivery from the client 1. More specifically, the determination unit 22 communicates with the client 1 via the communication unit 21 and acquires the time limit for delivery of the requested content from the time limit holding unit 13 of the client 1. The time limit thus acquired is stored into the time limit holding unit 23.

In step S4, the determination unit 22 of the server 2 determines the layer up to which the content requested for delivery is encoded in for transmission. Detailed steps constituting this process are shown in the flowchart of FIG. 7.

Figure 7:
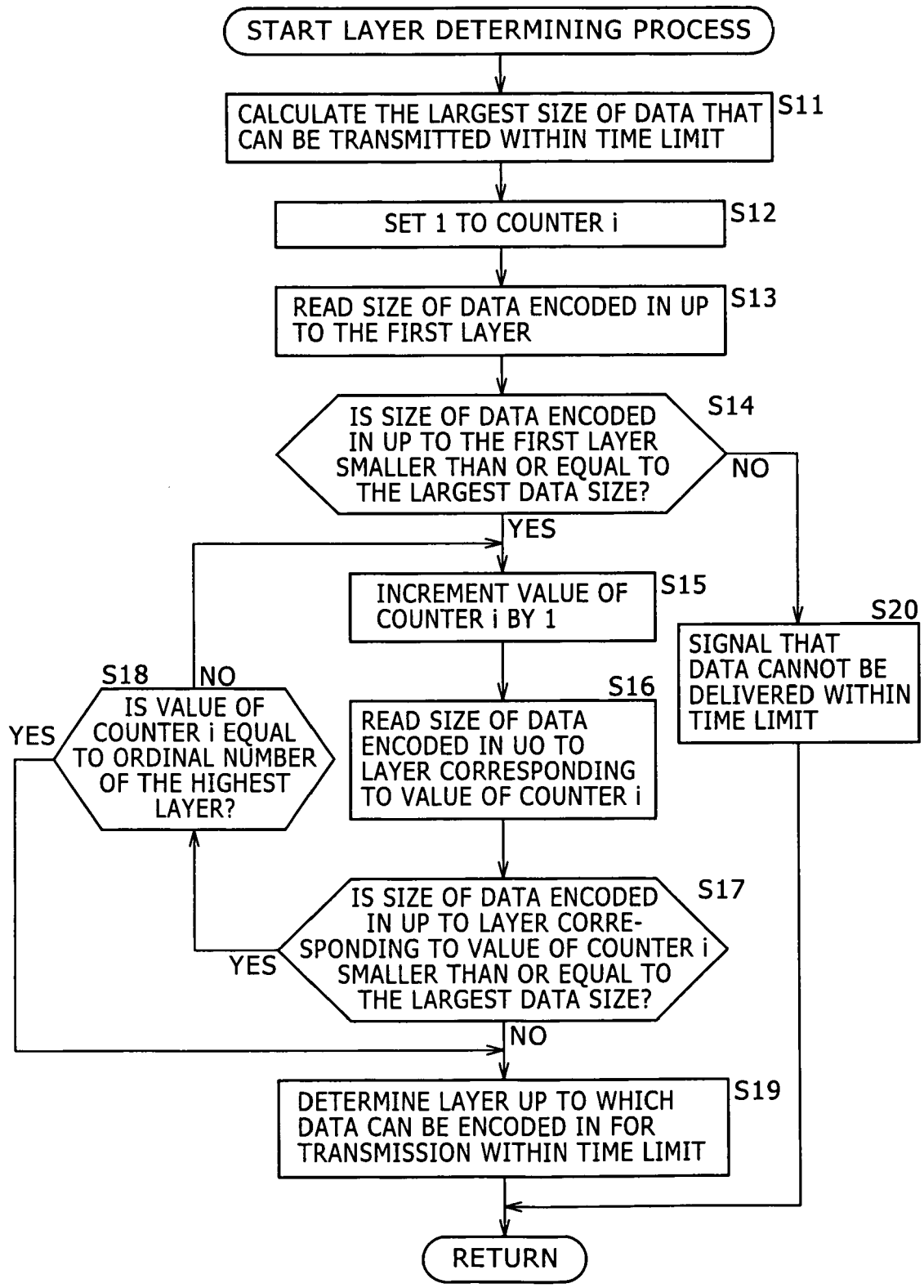
FIG. 7 is a flowchart of detailed steps performed in step S4 of FIG. 5.

In step S11 of FIG. 7, the determination unit 22 of the server 2 calculates the largest size of data that can be transmitted within the time limit. The calculation is made using the expression (2) below based on the bandwidth measured in step S2 between the client 1 and the server 2 and on the time limit acquired in step S3:

$$\text{largest data size} = \text{bandwidth (Mbps)} \times \text{time limit } (s) \qquad (2)$$

In step S12, the determination unit 22 initializes the value of a counter "i" to 1 pointing, in ascending order, to the highest possible layer in which the data to be transmitted can be encoded. The value 1 on the counter "i" corresponds to the first layer, 2 to the second layer, 3 to the third layer, and 4 to the fourth layer.

In step S13, the determination unit 22 reads from the layer size information (FIG. 4) the size of the data encoded in up to the first layer corresponding to the value 1 of the counter "i."

In step S14, the determination unit 22 checks to determine whether the size of the data encoded in up to the first layer as read in step S13 earlier is smaller than or equal to the largest data size calculated in step S11.

That is, in steps S12 through S14, a check is made to determine whether it is possible to transmit the data encoded in up to the first layer, the smallest size of data that can be transmitted, to the client 1 within the time limit.

If in step S14 it is determined that the size of the data encoded in up to the first layer is smaller than or equal to the largest possible data size (i.e., the case where the data encoded in up to the first layer can be transmitted to the client 1 within the time limit), then step S15 is reached.

In step S15, the determination unit 22 increments the value of the counter "i" by 1. In step S16, the determination unit 22 reads from the layer size information the size of the data encoded in up to the layer corresponding to the value of the counter "i."

In step S17, the determination unit 22 checks to determine whether the data size read in step S16 is smaller than or equal to the largest data size calculated in step S11. If it is determined in step S17 that the size of the data encoded in up to the layer corresponding to the counter value is smaller than or equal to the largest possible data size, then step S18 is reached.

In step S18, the determination unit 22 checks to determine whether the counter "i" has the value (4 in this case) corresponding to the highest layer up to which the data can be encoded in for transmission. If the value of the counter "i" is not found equal to 4, then step S15 is reached again and the value of the counter "i" is incremented by 1. The subsequent steps are then repeated.

If in step S17 it is determined that the size of the data encoded in up to the layer corresponding to the value of the counter "i" is larger than the largest data size calculated in step S11, or if in step S18 the value of the counter "i" is found equal to 4, then step S19 is reached.

That is, in steps S15 through S18, a check is made to determine whether it is possible to transmit the data encoded in up to the second layer, the third layer, or the fourth layer to the client 1 within the time limit.

In step S19, the determination unit 22 notifies the transcoder 27 of the highest layer in which to encode the data constituting the largest of the encoded data (if the result of the check in step S17 is negative, then the layer corresponding to the value of the counter "i" minus 1 is selected; if the result of the check in step S18 is affirmative, then the layer corresponding to the value 4 is selected) which was found in steps S14 and S17 to be smaller than or equal to the largest data size calculated in step S11 (i.e., the encoded data that can be transmitted to the client 1 within the time limit).

This is how the layer up to which the data is encoded in for transmission is determined.

If in step S14 the size of the data encoded in up to the first layer is found larger than the largest data size calculated in step S11 that means the encoded data cannot be transmitted within the time limit. In that case, step S20 is reached. In step S20, the determination unit 22 signals to the client 1 that the requested content cannot be delivered within the designated time limit.

After step S19 or S20, step S5 in FIG. 5 is reached. In step S5, the data encoded in up to the layer determined in step S4 is transmitted to the client 1. Detailed steps constituting the process of step S5 are shown in the flowchart of FIG. 8.

Figure 8:
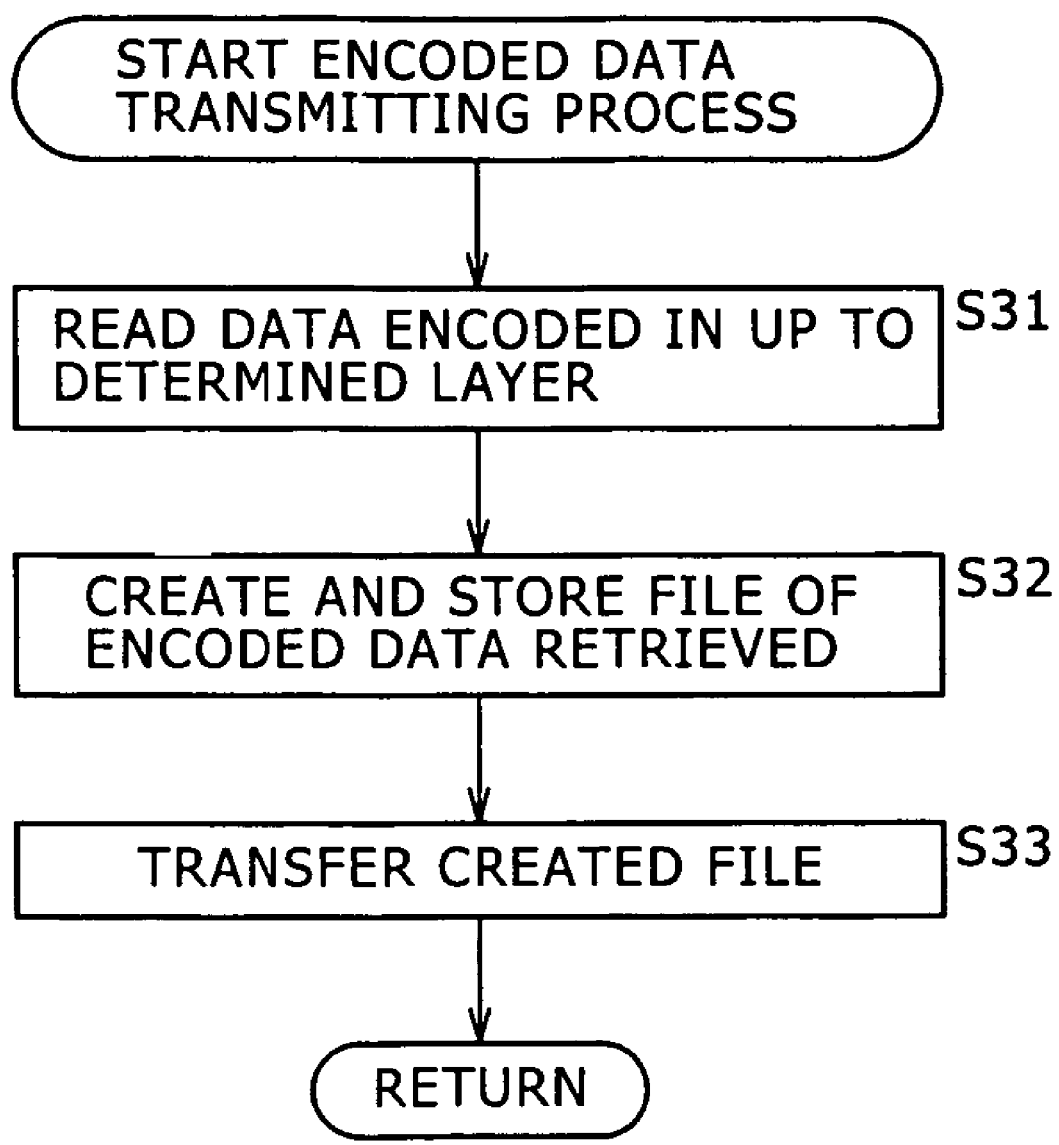
FIG. 8 is a flowchart of detailed steps performed in step S5 of FIG. 5.

In step S31 of FIG. 8, the transcoder 27 of the server 2 retrieves from the content holding unit 26 the data encoded in up to the layer signaled from the determination unit 22. In step S32, the transcoder 27 creates a single file of the retrieved data and stores the created file into the storage unit 28.

In step S33, the communication unit 21 transfers the file from the storage unit 28 to the client 1.

This is how the requested content is transmitted from the server 2 to the client 1.

As described, the appropriate amount of encoded data is selected in keeping with the designated time limit for transmission to the client 1. The requested content is then delivered to its destination within the designated time limit.

Although the bandwidth in effect between the client 1 and the server 2 is measured by the two sides in collaboration (in step S2 of FIG. 5), this is not limitative of the invention. If the client 1 and the server 2 are connected by a dedicated line and a predetermined bandwidth is ensured between the two, that bandwidth may be stored in the bandwidth holding unit 24 for subsequent usage. It is also possible for the user to establish a bandwidth (e.g., by manually operating the client 1 to set up a desired bandwidth) so that the established bandwidth may be acquired by the server 2 for use.

Figure 9:
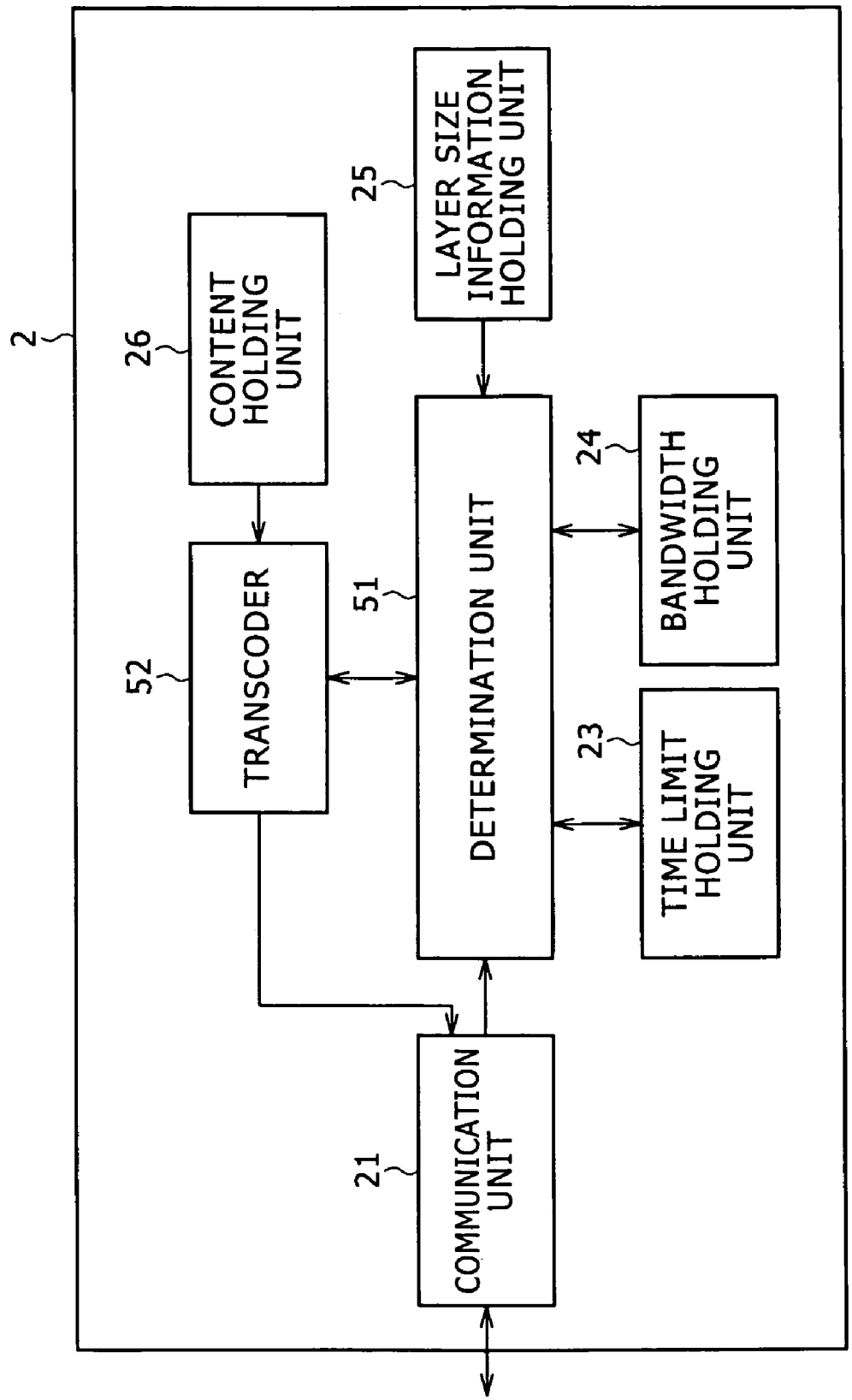
FIG. 9 is a block diagram showing another structure of the server 2 in FIG. 1.

FIG. 9 is a block diagram showing another structure of the server 2. The determination unit 22 of the server 2 in FIG. 3 is replaced by a determination unit 51 in FIG. 9 and the transcoder 27 in FIG. 3 by a transcoder 52 in FIG. 9. The storage unit 28 in the structure of FIG. 3 is not included in FIG. 9. The other components shown in FIG. 9 are the same as those in FIG. 3, and their descriptions are omitted where redundant.

The above-described server 2 in FIG. 3 was shown having its frame rate fixed (at 30 fps) and delivering content to the client 1 within a designated time limit by suitably adjusting the layer in up to which the content data is encoded for transmission. By contrast, the server 2 in FIG. 9 fixes the layer in up to which data is encoded for transmission (in this case, the content data is encoded in up to the fourth layer for transmission), and adjusts the frame rate so that the requested content may be delivered to the client 1 within the designated time limit. In this case, it is assumed that the content data is transmitted at the frame rate of 10 fps, 15 fps, or 30 fps.

How the server 2 of FIG. 9 works will now be described with reference to the flowchart of FIG. 10.

Figure 10:
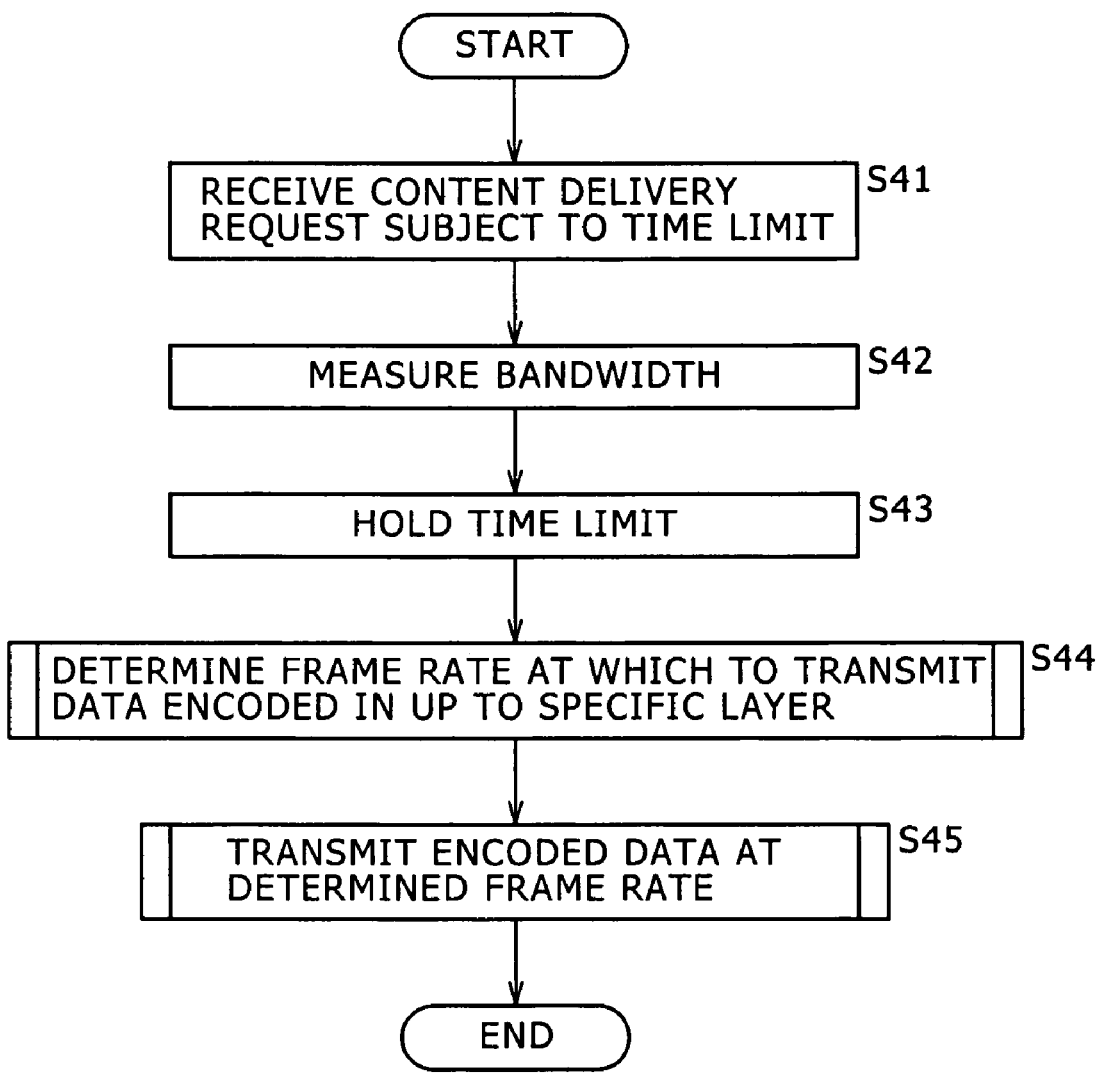
FIG. 10 is a flowchart of steps performed by the server 2 in FIG. 9.

Steps S41 through S43 in FIG. 10 are the same as steps S1 through S3 in FIG. 5 and thus will not be discussed further.

In step S44, the determination unit 51 of the server 2 determines the frame rate at which to transmit the content data encoded in up to the fourth layers (i.e., data encoded in the first through the fourth layers). Detailed steps constituting the process of step S44 are shown in the flowchart of FIG. 11.

Figure 11:
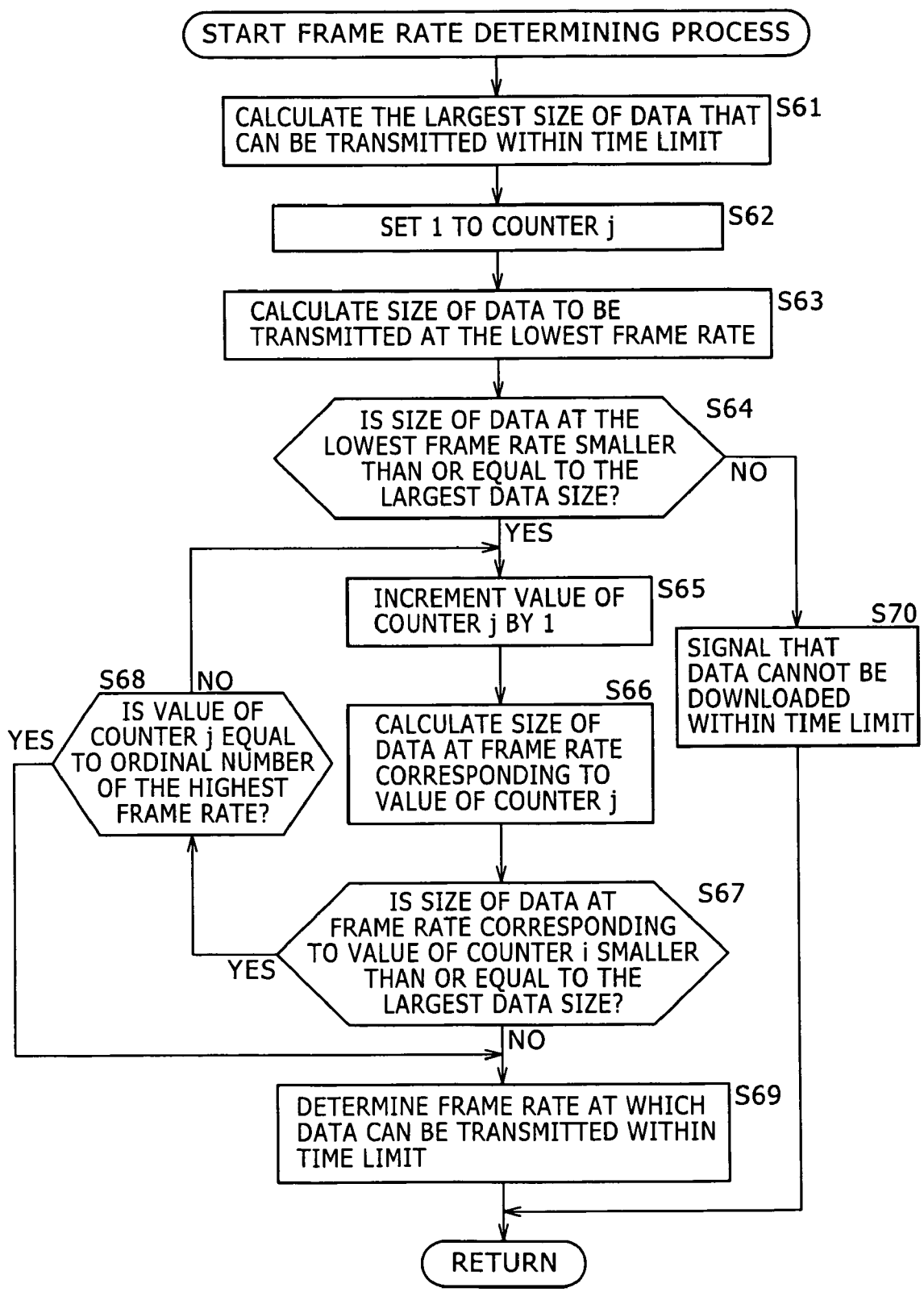
FIG. 11 is a flowchart of detailed steps performed in step S44 of FIG. 10.

In step S61 of FIG. 11, as in step S11 of FIG. 7, the determination unit 51 of the server 2 calculates the largest size of the content data that can be transmitted over the bandwidth in effect within the designated time limit (by use of the expression (2) shown above).

In step S62, the determination unit 51 initializes the value of a counter "j" to 1 pointing, in ascending order, to the frame rate at which the data is to be transmitted. The value 1 on the counter "j" corresponds to 10 fps (i.e., the lowest frame rate), 2 to 15 fps, and 3 to 30 fps.

In step S63, the determination unit 51 detects the size of the data encoded in up to the fourth layer for transmission at the frame rate of 10 fps corresponding to the value 1 of the counter "j."

From the example of FIG. 4, it can be seen that the data encoded in up to the fourth layer for transmission at the frame rate of 30 fps is 40 mega-bits in size. Since the frame rate of 10 fps is one third of 30 fps, the size of the data to be transmitted at 10 fps is one third of 40 mega-bits.

In this case, the determination unit 51 calculates the size of the data by referencing the layer size information held in the layer size information holding unit 25.

In step S64, the determination unit 51 checks to determine whether the data size calculated in step S63 is smaller than or equal to the largest data size calculated in step S61.

That is, in steps S62 through S64, a check is made to determine whether it is possible to transmit to the client 1 the data encoded in up to the fourth layer at the lowest frame rate (10 fps) within the designated time limit.

If in step S64 it is determined that the size of the data encoded in up to the fourth layer for transmission at the frame rate of 10 fps is smaller than or equal to the largest data size (i.e., if it is found possible to transmit to the client 1 the data encoded in up to the fourth layer at the frame rate of 10 fps within the time limit), then step S65 is reached.

In step S65, the determination unit 51 increments the value of the counter "j" by 1. In step S66, the determination unit 51 calculates the size of the data encoded in up to the fourth layer for transmission at the frame rate corresponding to the value of the counter "j."

In step S67, the determination unit 51 checks to determine whether the data size calculated in step S66 is smaller than or equal to the largest data size calculated in step S61. If the result of the check in step S67 is affirmative, then step S68 is reached.

In step S68, the determination unit 51 checks to determine whether the counter "j" has the value (3 in this case) corresponding to the highest frame rate. If the value of the counter "j" is not found equal to 3, then step S65 is reached again and the value of the counter "j" is incremented by 1. Step S66 and the subsequent steps are then repeated.

If in step S67 it is determined that the data size calculated in step S66 is larger than the largest data size calculated in step S61, or if in step S68 the value of the counter "j" is found equal to 3, then step S69 is reached.

That is, in steps S65 through S68, a check is made to determine whether it is possible to transmit to the client 1, within the time limit, the data encoded in up to the fourth layer for transmission at the frame rate of 15 fps or 30 fps.

In step S69, the determination unit 51 notifies the transcoder 52 of the frame rate for transmitting the largest of the encoded data that was found in steps S64 and S67 to be smaller than or equal to the largest data size calculated in step S61 (if the result of the check in step S67 is negative, then the frame rate corresponding to the value of the counter "j" minus 1 is selected; if the result of the check in step S68 is affirmative, then the frame rate corresponding to the value 3 is selected).

This is how the frame rate at which the encoded data is transmitted is determined.

If in step S64 the size of the data to be transmitted at the frame rate of 10 fps is found larger than the largest data size calculated in step S61 that means the encoded data cannot be transmitted within the time limit. In that case, step S70 is reached. In step S70, the determination unit 51 signals to the client 1 that the requested content cannot be delivered within the designated time limit.

After step S69 or S70, step S45 in FIG. 10 is reached. In step S45, the data encoded in up to the fourth layer is transmitted to the client 1 at the frame rate determined in step S44. Detailed steps constituting the process of step S45 are shown in the flowchart of FIG. 12.

Figure 12:
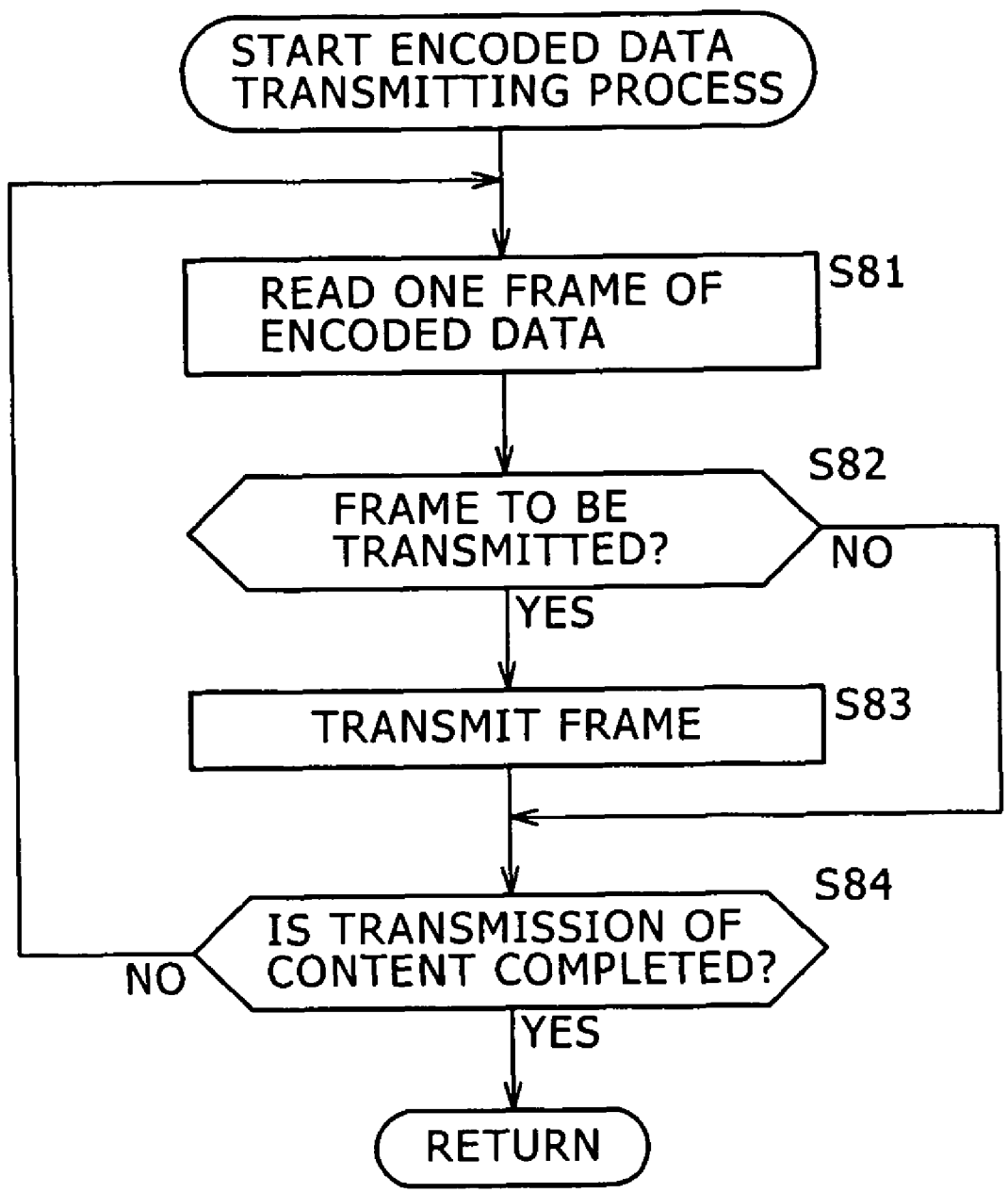
FIG. 12 is a flowchart of detailed steps performed in step S45 of FIG. 10.

In step S81 of FIG. 12, the transcoder 52 of the server 2 reads from the content holding unit 26 one frame of encoded data out of each of four sets of the requested content data encoded in up to the first through the fourth layers. In step S82, the transcoder 52 checks to determine whether the frame of data thus read is to be transmitted.

More specifically, the determination in step S82 is reached on the assumption that a whole frame is to be transmitted if the frame rate is 30 fps, half of the frame if the frame rate is 15 fps, and one third of the frame if the frame rate is 10 fps.

If in step S82 it is determined that the frame in question is to be transmitted, then step S83 is reached. In step S83, the transcoder 52 transmits the frame to the client 1 via the communication unit 21. If in step S82 it is determined that the frame is not to be transmitted, then step S83 is skipped and the frame in question is not transmitted.

If in step S83 the frame of interest is transmitted, or if in step S82 it is determined that the frame is not to be transmitted, then step S84 is reached. In step S84, the transcoder 52 checks to determine whether all frames have been checked for their transmission (i.e., whether the transmission of all frames has been completed). If not all frames are found to have been checked for their transmission, then step S81 is reached again and the next frame is read. Step S82 and the subsequent steps are then repeated on the new frame.

If in step S84 the transmission of the content data as a whole is found to be complete, the process is terminated.

This is how the requested content is transmitted to the client 1.

With the frame rate selected as described above, an appropriate size of layered-encoded data may be transmitted to the client 1 within the designated time limit. This is how content is delivered to its destination within the time limit in effect.

Figure 13:
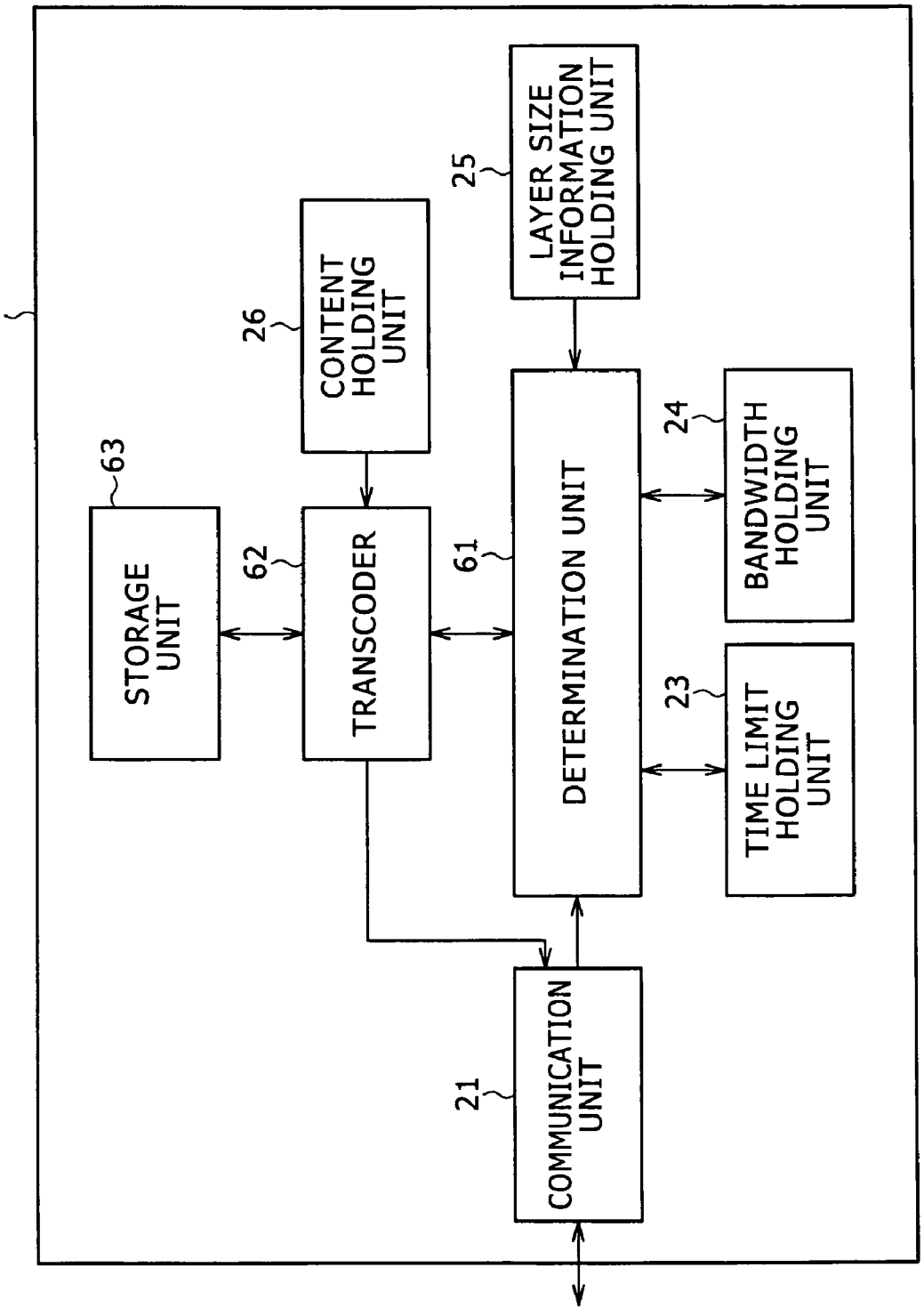
FIG. 13 is a block diagram showing another structure of the server 2 in FIG. 1.

FIG. 13 is a block diagram showing another structure of the server 2. The determination unit 22 of the server 2 in FIG. 3 is replaced by a determination unit 61 in FIG. 13, the transcoder 27 in FIG. 3 by a transcoder 62 in FIG. 13, and the storage unit 28 in FIG. 3 by a storage unit 63 in FIG. 13.

In the foregoing description, the server 2 in FIG. 3 was shown having its frame rate fixed while adjusting the layer up to which content data is encoded in for transmission, and the server 2 in FIG. 9 was shown fixing the layer up to which data is encoded in for transmission while adjusting the frame rate at which to transmit the layered-encoded data, so that the requested content is delivered in either case to the client 1 within the designated time limit. By contrast, the sever 2 in FIG. 13 adjusts both the frame rate and the layer in such a manner as to deliver content to its destination within the specified time limit.

How the server 2 of FIG. 13 works will now be described with reference to the flowchart of FIG. 14.

Figure 14:
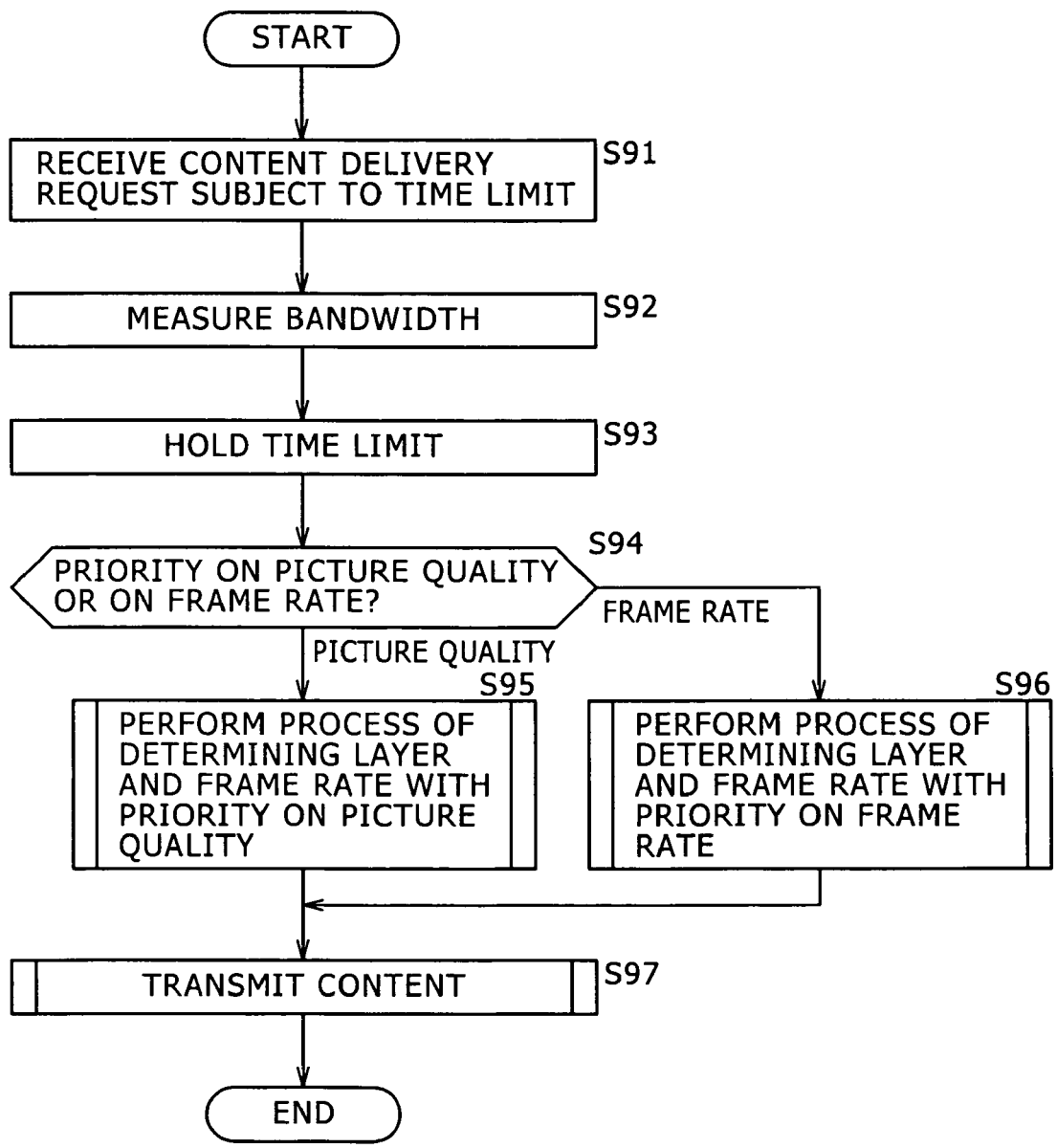
FIG. 14 is a flowchart of steps performed by the server 2 in FIG. 13.

Steps S91 through S93 in FIG. 14 are the same as steps S1 through S3 in FIG. 5 and thus will not be discussed further.

In step S94, the determination unit 61 of the server 2 checks to determine whether priority is on picture quality or on frame rate. As will be discussed later more specifically, it is determined in step S94 whether priority in on the highest possible layer up to which the requested content is to be encoded in for transmission (i.e., with the highest possible picture quality), or on the highest possible frame rate at which the layered-encoded data is to be transmitted.

In this case, the content holding unit 26 holds, along with layered-encoded content data, priority information as meta data about the content indicating whether priority is on picture quality or on frame rate. The determination unit 61 references the priority information in order to determine whether picture quality or frame rate is given priority.

If in step S94 it is determined that priority is on picture quality, then step S95 is reached. In step S95, the determination unit 61, given that priority is on picture quality, determines the layer and the frame rate for transmission of the layered-encoded data. Detailed steps constituting the process of step S95 are shown in the flowchart of FIG. 15.

Figure 15:
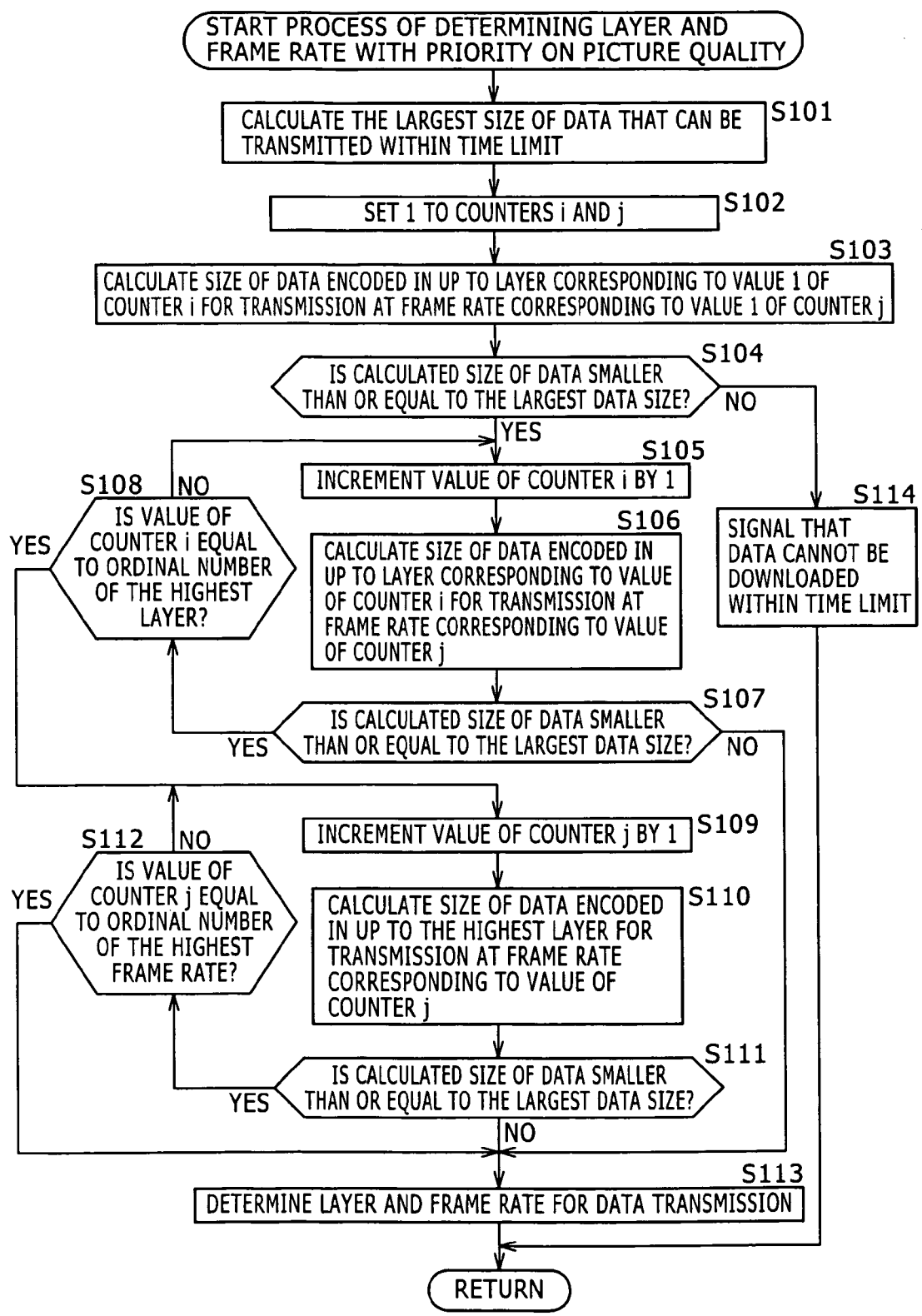
FIG. 15 is a flowchart of detailed steps performed in step S95 of FIG. 14.

In step S101 of FIG. 15, as in step S11 of FIG. 7, the determination unit 61 calculates the largest size of the content data that can be transmitted over the bandwidth in effect within the designated time limit (by use of the expression (2) shown above).

In step S102, the determination unit 61 initializes the values of counters "i" and "j" to 1 each. In step S103, the determination unit 61 calculates the size of the data encoded in up to the layer corresponding to the value 1 of the counter "i" for transmission at the frame rate corresponding to the value 1 of the counter "j."

As in the case of FIG. 7, the value 1 of the counter "i" corresponds to the first layer, 2 to the second layer, 3 to the third layer, and 4 to the fourth layer. And as in the case of FIG. 11, the value 1 of the counter "j" corresponds to the frame rate of 10 fps (i.e. the lowest frame rate), 2 to 15 fps, and 3 to 30 fps for data transmission.

In this case, the determination unit 61 calculates the data size in effect when the data encoded in the first layer is transmitted at the frame rate of 10 fps.

In step S104, the determination unit 61 checks to determine whether the data size calculated in step S103 is smaller than or equal to the largest data size calculated in step S101. If the result of the check in step S104 is affirmative, then step S105 is reached.

In step S105, the determination unit 61 increments the value of the counter "i" by 1. Step S105 is followed by step S106.

In step S106, the determination unit 61 calculates the size of the data encoded in up to the layer corresponding to the value of the counter "i" for transmission at the frame value corresponding to the value of the counter "j."

In step S107, the determination unit 61 checks to determine whether the data size calculated in step S106 is smaller than or equal to the largest data size calculated in step S101. If the result of the check in step S107 is affirmative, then step S108 is reached.

In step S108, the determination unit 61 checks to determine whether the counter "i" has the value (4 in this case) corresponding to the highest layer. If the value of the counter "i" is not found equal to 4, then step S105 is reached again and the value of the counter "i" is incremented by 1. Step S106 and the subsequent steps are then repeated.

If in step S108 the value of the counter "i" is found equal to 4, then step S109 is reached. At this point, the value of the counter "j" is incremented by 1.

In step S110, the determination unit 61 calculates the size of the data encoded in up to the fourth layer (i.e., the highest layer) corresponding to the value 4 of the counter "i" for transmission at the frame rate corresponding to the current value of the counter "j."

In step S111, the determination unit 61 checks to determine whether the data size calculated in step S110 is smaller than or equal to the largest data size calculated in step S101. If the result of the check in step S110 is affirmative, then step S112 is reached.

In step S112, the determination unit 61 checks to determine whether the counter "j" has the value (3 in this case) corresponding to the highest frame rate. If in step S112 the value of the counter "j" is not found equal to 3, then step S109 is reached again and the value of the counter "j" is incremented by 1. Step S110 and the subsequent steps are then repeated.

If in step S107 or in step S111 it is determined that the data size calculated in step S106 or S110 is larger than the largest data size calculated in step S101, or if in step S112 the value of the counter "j" is found equal to 3, then step S113 is reached.

In step S113, the determination unit 61 notifies the transcoder 62 of the layer and the frame rate for transmitting the largest of the layered-encoded data that was found in step S104, S107, or S111 to be smaller than or equal to the largest data size calculated in step S101 (if the result of the check in step S107 or S111 is negative, then the layer corresponding to the value of the counter "i" minus 1 and the frame rate corresponding to the value of the counter "j" minus 1 are selected; if the result of the check in step S112 is affirmative, then the layer corresponding to the counter value 4 and the frame rate corresponding to the counter value 3 are selected).

In the manner described above, the layer up to which the data is encoded in for transmission is determined. Because priority is on picture quality in this case, a determination is first made of the highest possible layer (by repeating steps S105 through S108 to raise picture quality). If it is determined that the data can be encoded in up to the highest layer (i.e., if the result of the check in step S108 is affirmative), then a determination is made of the highest possible frame rate for transmission (by repeating steps S109 through S112). This is how the layer and the frame rate for transmission of the layered-encoded data are determined.

If, in step S94 back in FIG. 14, it is determined that priority is on frame rate, then step S96 is reached. In step S96, the determination unit 61 determines the frame rate and the layer for transmitting the layered-encoded data where the priority is on the frame rate. Detailed steps constituting the process of step S96 are shown in the flowchart of FIG. 16.

Figure 16:
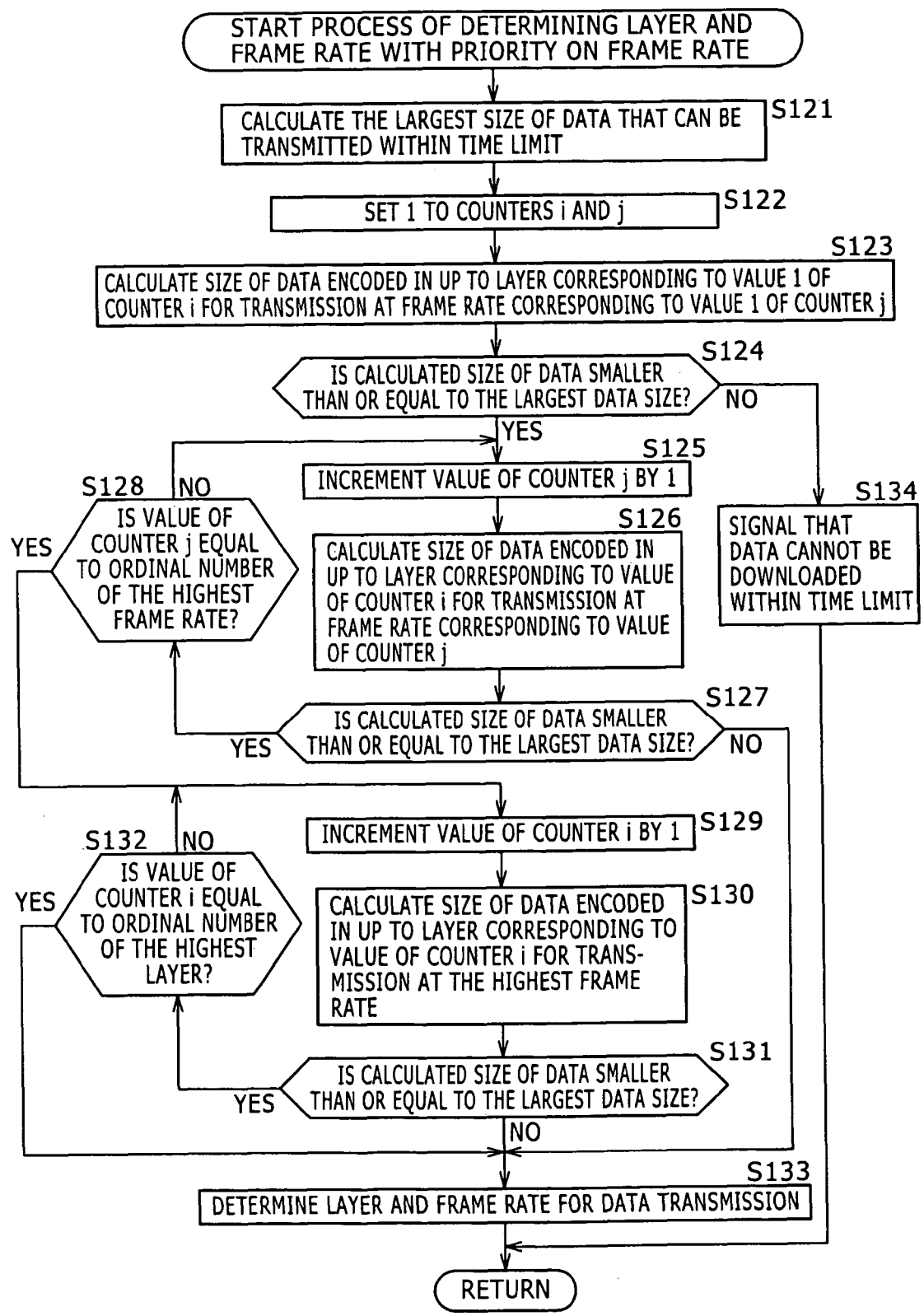
FIG. 16 is a flowchart of detailed steps performed in step S96 of FIG. 14.

In step S121 of FIG. 16, as in step S11 of FIG. 7, the determination unit 61 calculates the largest size of the content data that can be transmitted over the bandwidth in effect within the designated time limit (by use of the expression (2) shown above).

In step S122, the determination unit 61 initializes the values of counters "i" and "j" to 1 each. In step S123, the determination unit 61 calculates the size of the data encoded in up to the layer corresponding to the value 1 of the counter "i" for transmission at the frame rate corresponding to the value 1 of the counter "j."

That is, the determination unit 61 calculates the size of the data encoded in the first layer for transmission at the frame rate of 10 fps.

In step S124, the determination unit 61 checks to determine whether the data size calculated in step S123 is smaller than or equal to the largest data size calculated in step S121. If the result of the check in step S124 is affirmative, then step S125 is reached.

In step S125, the determination unit 61 increments the value of the counter "j" by 1.

In step S126, the determination unit 61 calculates the size of the data which is to be transmitted at the frame rate corresponding to the value of the counter "j" and which is encoded in up to the layer corresponding to the value of the counter "i" for transmission.

In step S127, the determination unit 61 checks to determine whether the data size calculated in step S126 is smaller than or equal to the largest data size calculated in step S121. If the result of the check in step S127 is affirmative, then step S128 is reached.

In step S128, the determination unit 61 checks to determine whether the counter "j" has the value (3 in this case) corresponding to the highest frame rate. If the value of the counter "j" is not found equal to 3, then step S125 is reached again and the value of the counter "j" is incremented by 1. Step S126 and the subsequent steps are then repeated.

If in step S128 the value of the counter "j" is found equal to 3, then step S129 is reached. At this point, the determination unit 61 increments the value of the counter "i" by 1.

In step S130, the determination unit 61 calculates the size of the data which is to be transmitted at the frame rate of 30 fps corresponding to the value 3 of the counter "j" and which is encoded in up to the layer corresponding to the current value of the counter "i" for transmission.

In step S131, the determination unit 61 checks to determine whether the data size calculated in step S130 is smaller than or equal to the largest data size calculated in step S121. If the result of the check in step S130 is affirmative, then step S132 is reached.

In step S132, the determination unit 61 checks to determine whether the counter "i" has the value (4 in this case) corresponding to the highest layer. If in step S132 the value of the counter "i" is not found equal to 4, then step S129 is reached again and the value of the counter "i" is incremented by 1. Step S130 and the subsequent steps are then repeated.

If in step S127 or in step S131 it is determined that the data size calculated in step S126 or S130 is larger than the largest data size calculated in step S121, or if in step S132 the value of the counter "i" is found equal to 4, then step S133 is reached.

In step S133, the determination unit 61 notifies the transcoder 62 of the frame rate and the layer for transmitting the largest of the layered-encoded data that was found in step S124, S127, or S131 to be smaller than or equal to the largest data size calculated in step S121 (if the result of the check in step S127 or S131 is negative, then the layer corresponding to the value of the counter "i" minus 1 and the frame rate corresponding to the value of the counter "j" minus 1 are selected; if the result of the check in step S132 is affirmative, then the layer corresponding to the counter value 4 and the frame rate corresponding to the counter value 3 are selected).

In the manner described above, the determination unit 61 determines the layer up to which the data is encoded in for transmission and the frame rate at which the layered-encoded data is to be transmitted. Because priority is on frame rate in this case, a determination is first made of the highest possible frame rate (by repeating steps S125 through S128 to raise the frame rate). If it is determined that the data can be transmitted at the highest frame rate (i.e., if the result of the check in step S128 is affirmative), then a determination is made of the highest possible layer in which the data is encoded for transmission (by repeating steps S129 through S132). This is how the layer and the frame rate for transmission of the layered-encoded data are determined.

In step S97 back in FIG. 14, the content data is transmitted to the client 1 in keeping with the layer and the frame rate determined in step S95 or S96. Detailed steps constituting the process of step S97 are shown in the flowchart of FIG. 17.

Figure 17:
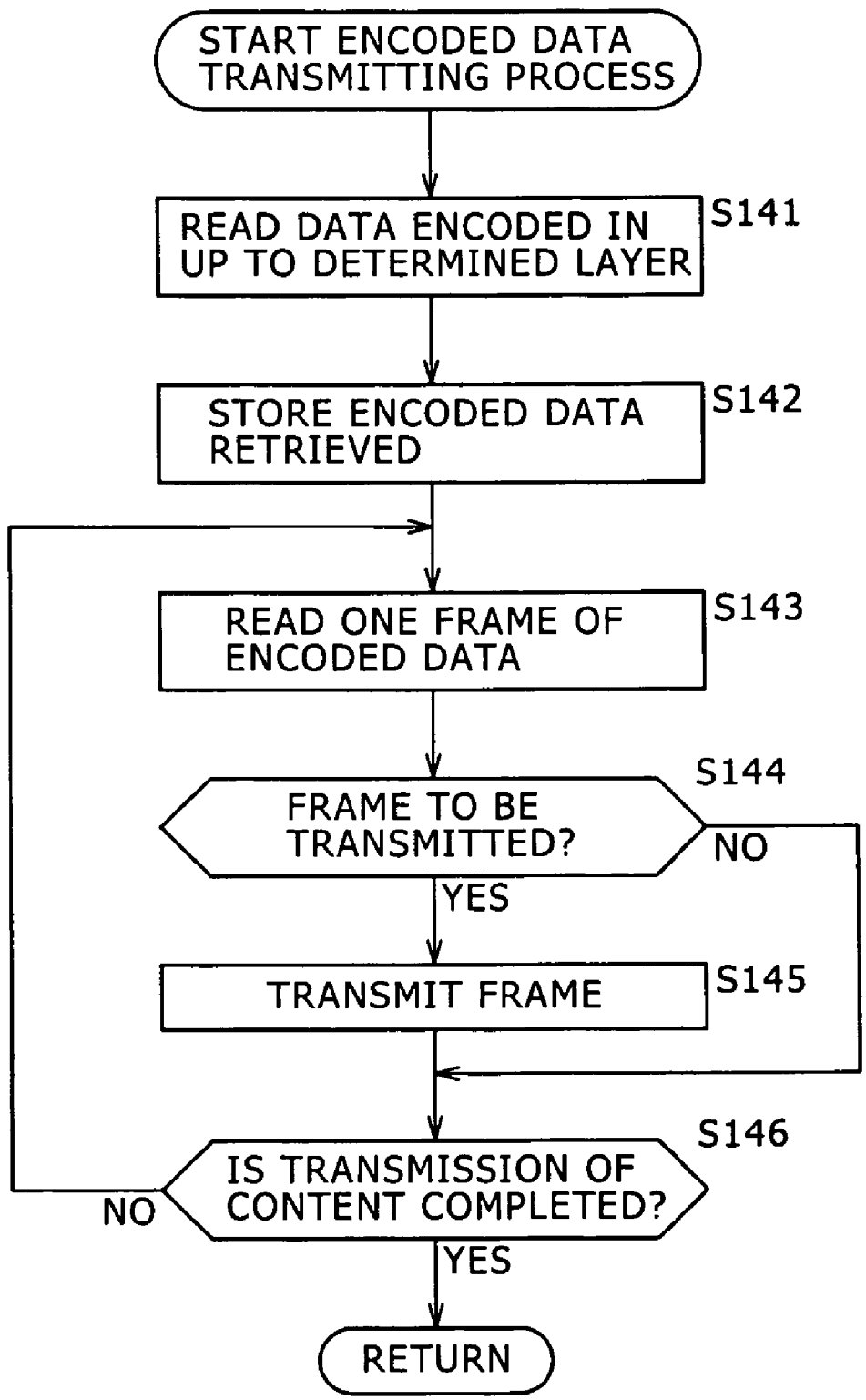
FIG. 17 is a flowchart of detailed steps performed in step S97 of FIG. 14.

In step S141 of FIG. 17, the transcoder 62 of the server 2 reads from the content holding unit 26 the data encoded in up to the layer signaled from the determination unit 61. In step S142, the transcoder 62 stores the retrieved data into the storage unit 63.

In step S143, the transcoder 62 reads the layered-encoded data from the storage unit 63 one frame at a time. In step S144, the transcoder 62 checks to determine whether the frame of data thus read is to be transmitted.

More specifically, as in step S82 of FIG. 12, the determination in step S144 is reached on the assumption that a whole frame is to be transmitted if the frame rate is 30 fps, half of the frame if the frame rate is 15 fps, and one third of the frame if the frame rate is 10 fps.

If in step S144 it is determined that the frame in question is to be transmitted, then step S145 is reached. In step S145, the transcoder 62 transmits the frame to the client 1 via the communication unit 21.

If in step S145 the frame of interest is transmitted, or if in step S144 it is determined that the frame is not to be transmitted, then step S146 is reached. In step S146, the transcoder 62 checks to determine whether all frames have been checked for their transmission (i.e., whether the transmission of all frames has been completed). If not all frames are found to have been checked for their transmission, then step S143 is reached again and the next frame is read. Step S144 and the subsequent steps are then repeated on the new frame. If in step S144 it is determined that the frame is not to be transmitted, then step S145 is skipped and the frame in question is not transmitted.

This is how the requested content is transmitted to the client 1.

Described below is how the priority information used in the example of FIG. 13 is typically generated. Illustratively, the priority information is generated by an encoder 71 in FIG. 18 which generates the encoded data constituting the content to be held in the content holding unit 26. The encoder 71 may be incorporated in the server 2 to generate the priority information that is sent to the content holding unit 26 for storage therein as meta data about the content. Alternatively, the encoder 71 may be provided as an external device generating the priority information that is supplied to the server 2 along with the encoded content data. In the latter case, the server 2 may input the externally supplied priority information for storage into the content holding unit 26.

An encoding unit 81 of the encoder 71 encodes the frames of the content of interest in four layers representative of four different picture quality levels. The four sets of the layered-encoded data (i.e., data encoded in the first through the fourth layers) derived from the encoding process are stored into the content holding unit 26.

During the encoding process, the encoding unit 81 calculates on a frame-by-frame basis an amount of change in luminance for the entire content, and thereby calculates an average amount of change in luminance for the content as a whole. The average amount of change in luminance thus calculated is supplied to a priority information generation unit 82 of the encoder 71.

The priority information generation unit 82 compares the average amount of change in luminance supplied form the encoding unit 81, with a predetermined threshold value. If the average amount is found larger than the threshold, then the priority information generation unit 82 generates priority information that places priority on frame rate. That is, where the content is composed of dynamically moving pictures such as those of sports, the information putting priority on frame rate is generated to permit smooth video display of the content. If the content is constituted by pictures of fewer movements such as those of news programs, then the information placing priority on picture quality is generated because the display of such pictures does not need a high frame rate.

How the encoder 71 works will now be described with reference to the flowchart of FIG. 19.

Figure 19:
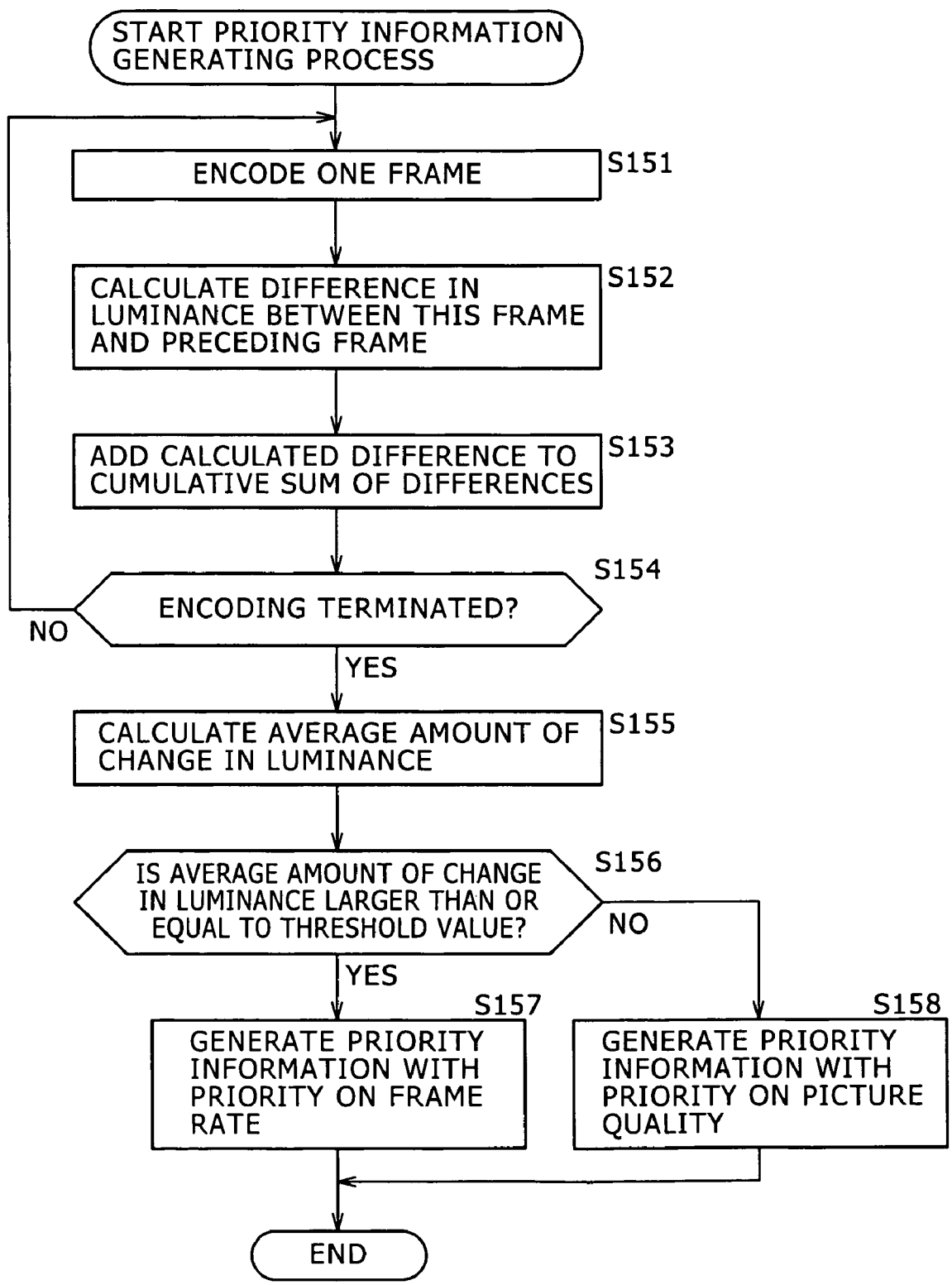
FIG. 19 is a flowchart of steps performed by the encoder 71 in FIG. 18.

In step S151 of FIG. 19, the encoding unit 81 of the encoder 71 encodes one frame of the content of interest.

In step S152, the encoding unit 81 calculates the difference in luminance between the frame encoded in step S151 on the one hand, and the immediately preceding frame on the other hand (i.e., previously encoded frame), the difference being formed by divergences between pixels in terms of luminance.

In step S153, the encoding unit 81 adds the difference calculated in step S152 to the cumulative sum of differences per pixel.

In step S154, the encoding unit 81 checks to determine whether all frames have been encoded. If there is any frame yet to be encoded, step S151 is reached again and the next frame is encoded. Steps S152 and the subsequent steps are then repeated.

If in step S154 it is determined that all frames have been encoded, then step S155 is reached. In step S155, the encoding unit 81 using the expression (3) below calculates the average amount of the differences in luminance (i.e., changes in luminance) accumulated in step S153. The encoding unit 81 supplies the calculated average amount to the priority information generation unit 82. The expression (3) is given as $$\text{average amount of change in luminance} = \text{accumulated sum of differences/number of frames} \qquad (3)$$

In step S156, the priority information generation unit 82 compares the average amount of change in luminance supplied from the encoding unit 81 with a predetermined threshold value. A check is made in this step to determine whether the average amount is larger than or equal to the threshold.

If in step S156 the supplied average amount is found larger than or equal to the threshold value (i.e., if the pictures have dynamic motions), then step S157 is reached. In step S157, the priority information generation unit 82 generates the priority information that places priority on frame rate. If in step S156 the average amount is found smaller than the threshold value, then step S158 is reached. In step S158, the priority information generation unit 82 generates the priority information placing priority on picture quality.

This is how the priority information is generated.

In the foregoing description, it was assumed that content is layered-encoded on the basis of picture quality. However, this is not limitative of the invention. Alternatively, the present invention may also be applied where content is layered-encoded on the basis of picture size.

More specifically, the server 2 may hold content made up of the data encoded with, say, five different resolutions R0 through R4. Any one of the five sets of the layered-encoded data may be selected to comply with the designated time limit before being sent to the client 1.

Figure 20:
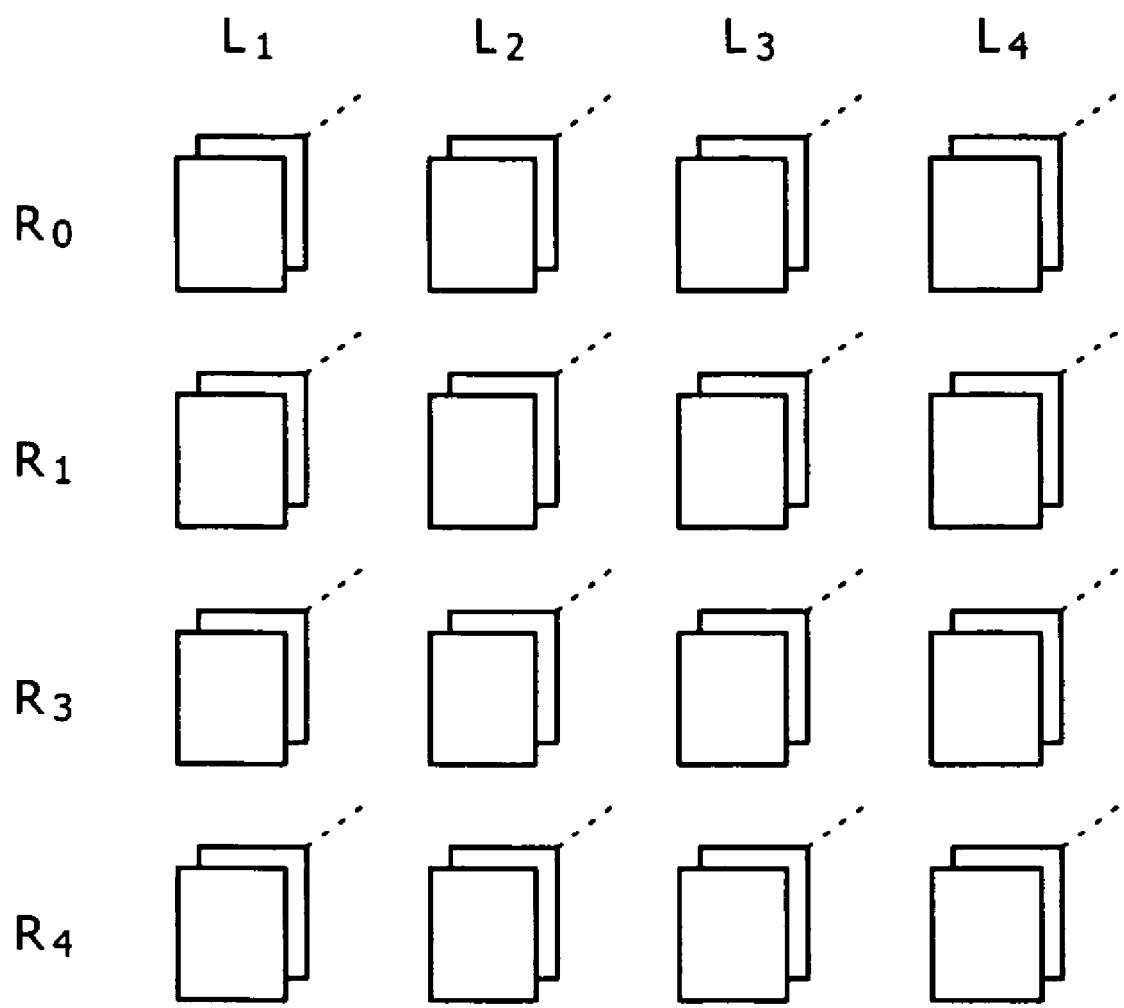
FIG. 20 is a schematic view showing examples of encoded content data.

Under the JPEG 2000 standard, scalability may be provided in terms of both picture quality and picture size. In that case, as shown in FIG. 20, the server 2 may hold content formed by the data encoded in, say, four different picture qualities L1 through L4 for each of the five sets of the data encoded with the resolutions R0 through R4. Any one of the combined sets of the layered-encoded data may be selected to comply with the designated time limit and other constraints before being transmitted to the client 1.

The series of steps or processes described above may be executed either by hardware or by software. For the software-based processing to take place, the programs constituting the software may be installed into a suitable computer and executed in such a manner as to implement the functions of the client 1 and server 2.

FIG. 21 is a block diagram showing a typical structure of a computer 501. In FIG. 21, a CPU (Central Processing Unit) 511 is connected to an input/output interface 516 via a bus 515. Also connected to the input/output interface is an input unit 518 made up of a keyboard and a mouse. When the user inputs commands by operating the input unit 518, corresponding programs held in a ROM (Read Only Memory) 512, a hard disk drive 514, or a recording medium such as a magnetic disk 531 to be mounted on a drive 20, an optical disk 532, a magneto-optical disk 533, or a semiconductor memory 534 are loaded into a RAM (Random Access Memory) 513 and executed. The programs when executed carry out the diverse steps and processes discussed above. The result of the execution is output as needed by the CPU 511 to an output unit 517 such as an LCD (Liquid Crystal Display) by way of the input/output interface 516. Alternatively, the programs may be preinstalled on the hard disc drive 514 or in the ROM 512 and offered to the user integrally with the computer 501. As another alternative, the programs may be furnished as package media in the form of the magnetic disk 531, optical disk 532, magneto-optical disk 533 or semiconductor memory 534 or the like. As yet another alternative, the programs may be brought to the hard disk drive 514 through satellite links or network connections or the like via a communication unit 519.

In this specification, the steps which describe the programs to be executed and stored on the recording medium represent not only the processes that are to be carried out in the depicted sequence (i.e., on a time series basis) but also processes that may be performed parallelly or individually and not chronologically.

As many apparently different embodiments of this invention may be made without departing from the spirit and scope thereof, it is to be understood that the invention is not limited to the specific embodiments thereof except as defined in the appended claims.

The invention claimed is:

1. A content delivery system comprising a client and a server, said client requesting deliveries of content from said server which transforms said content into layered-encoded data for transmission to said client over a network:

wherein said client includes an input device for inputting a time limit within which said content is to be delivered;

a requesting device for requesting a delivery of said content from said server within said time limit; and a communications unit for receiving layered-encoded data constituting said content of which the delivery has been requested by said requesting device and which is transmitted from said server; and wherein said server includes an acquiring device for acquiring said time limit;

a priority information generation unit for calculating an amount of change luminance in said content, comparing the calculated amount of change in luminance in said content to a predetermined threshold, and generating priority information based on the comparison, wherein said priority information indicating whether priority is on picture quay or on frame rate;

a determining unit for measuring bandwidth applicable to said client and storing the measured bandwidth in the server, and determining a layer up to which said content to be encoded into layer-encoded data and a frame rate at which the layer-encoded data to be transmitted to said client within said time limit, wherein the determining being based on said time limit, on the priority information, on the measured bandwidth and on size information about the layer-encoded data, wherein if said priority information indicates that priority is on picture quality, the determining comprises first determining a highest possible layer to encode said content into the layer-encoded data, then determining highest possible frame rate to transmit the layer-encoded data, wherein if said priority information indicates that priority is on frame rate, the determining comprises first determining a highest possible frame rate to transmit the layer-encoded data, then determining a highest possible layer to encode said content into the layer-encoded data; and a transmitting device for transmitting to said client said layered-encoded data at said frame rate determined by said determining unit.

2. The content delivery system according to claim 1, wherein said determining unit determines a layer up to which said content is encoded in for data transmission based on said time limit, said bandwidth, and said size information; and wherein said transmitting device transmits the data encoded in up to said layer determined by said determining unit, to said client at said frame rate.

3. A communicating apparatus for transmitting content as layered-encoded data to a client over a network, said communicating apparatus comprising:

acquiring means which, if said client requests a delivery of content within a time limit, then acquires said time limit;

priority information generation means for calculating an amount of change in luminance in said content, comparing the calculated amount of change in luminance in said content to a predetermined threshold, and generating priority information based on the comparison, wherein the priority information indicating whether priority is on picture quality or on frame rate;

determining means for measuring bandwidth applicable to said client and storing the measured bandwidth in the server, and determining a layer up to which said content to be encoded into layer-encoded data and a frame rate at which the layer-encoded data to be transmitted to said client within said time limit, wherein the determining being based on said time limit, on the priority information, on the measured bandwidth and on size information about the layer-encoded data wherein if said priority information indicates that priority is on picture quality, the determining comprises first determining a highest possible layer to encode said content into the layer-encoded data, then determining highest possible frame rate to transmit the layer-encoded data, wherein if said priority information indicates that priority is on frame rate, the determining comprises first determining a highest possible frame rate to transmit the layer-encoded data, then determining a highest possible layer to encode said content into the layer-encoded data; and transmitting means for transmitting to said client said layered-encoded data at said frame rate determined by said determining means.

4. The communicating apparatus according to claim 3, further comprising:

content holding means for holding said layered-encoded data constituting said content which can be transmitted; and size information holding means for holding said size information.

5. The communicating apparatus according to claim 3, wherein said determining means determines a layer up to which said content is encoded in for data transmission based on said time limit, said size information, and said bandwidth; and wherein said transmitting means transmits the data encoded in up to said layer determined by said determining means, to said client at said frame rate.

6. The communicating apparatus according to claim 3, wherein said determining means determines a layer up to which said content is encoded in and a frame rate at which the encoded data is transmitted, based on said time limit, said size information, and said bandwidth; and wherein said transmitting means transmits the data encoded in up to said layer determined by said determining means, to said client at said frame rate determined by said determining means.

7. A communicating apparatus for transmitting content as layered-encoded data to a client over a network, said communicating apparatus comprising:

acquiring means which, if said client requests a delivery of content within a time limit, then acquires said time limit;

priority information acquiring means for acquiring priority information indicating whether priority is on picture quality or on frame rate, wherein said priority information acquiring means acquires said priority information from a priority information generating apparatus comprising: calculating means for calculating an amount of change in luminance in said content; and generating means for comparing the calculated amount of change in luminance in said content to a predetermined threshold, and generating said priority information based on the comparison;

determining means for measuring bandwidth applicable to said client and storing the measured bandwidth in the server, and determining a layer up to which said content to be encoded into layer-encoded data and a frame rate at which the layer-encoded data to be transmitted to said client within said time limit, wherein the determining being based on said time limit, on the priority information, on the measured bandwidth and on size information about the layer-encoded data, wherein if said priority information indicates that priority is on picture quality, the determining comprises first determining a highest possible layer to encode said content into the layer-encoded data, then determining a highest possible frame rate to transmit the layer-encoded data, wherein if said priority information indicates that priority is on frame rate, the determining comprises first determining a highest possible frame rate to transmit the layer-encoded data, then determining a highest possible layer to encode said content into the layer-encoded data; and transmitting means for transmitting to said client said layered-encoded data at said frame rate determined by said determining means.

8. A communicating method for transmitting content as layered-encoded data to a client over a network, said communicating method comprising the steps of:

if said client requests a delivery of content within a time limit, then acquiring said time limit;

measuring bandwidth applicable to said client and storing the measured bandwidth in a server;

generating priority information by calculating an amount of change in luminance in said content, comparing the calculated amount of change in luminance in said content to a predetermined threshold, and generating priority information based on the comparison, wherein the priority information indicating whether priority is on picture quality or on frame rate;

determining a layer up to which said content to be encoded into layer-encoded data and a frame rate at which the layer-encoded data to be transmitted to said client within said time limit, wherein the determining being based on said time limit, on the priority information, on the measured bandwidth and on size information about the layer-encoded data, wherein if said priority information indicates that priority is on picture quality, the determining comprises first determining a highest possible layer to encode said content into the layer-encoded data, then determining a highest possible frame rate to transmit the layer-encoded data, wherein said priority information indicates that priority on frame rate, the determining comprises first determining a highest possible frame rate to transmit the layer-encoded data, then determining highest possible layer to encode said content into the layer-encoded data;

transmitting to said client said layered-encoded data at said frame rate determined in said determining step.

9. A content delivery system comprising a client and a server, said client requesting deliveries of content from said server which transforms said content into layered-encoded data for transmission to said client over a network:

wherein said client includes an inputting device inputting a time limit within which said content is to be delivered;

a requesting device requesting a delivery of said content from said server within said time limit; and a receiving device receiving layered-encoded data constituting said content of which the delivery has been requested by said requesting device and which is transmitted from said server; and wherein said server includes an acquiring device acquiring said time limit;

a priority information generation device for calculating an amount of change in luminance in said content, comparing the calculated amount of change in luminance in said content to a predetermined threshold, and generating priority information based on the comparison, wherein the priority information indicating whether priority is on picture quality or on frame rate;

a determining device measuring bandwidth applicable to said client and storing the measured bandwidth in the server, and determining a layer up to which said content to be encoded into layer-encoded data and a frame rate at which the layer-encoded data to be transmitted to said client within said time limit, wherein the determining being based on said time limit, on the priority information, on the measured bandwidth and on size information about the layer-encoded data, wherein if said priority information indicates that priority is on picture quality, the determining comprises first determining a highest possible layer to encode said content into the layer-encoded data, then determining a highest possible frame rate to transmit the layer-encoded data, wherein if said priority information indicates that priority is on frame rate, the determining comprises first determining a highest possible frame rate to transmit the layer-encoded data, then determining a highest possible layer to encode said content into the layer-encoded data; and a transmitting device transmitting to said client said layered-encoded data at said frame rate determined by said determining device.

10. A communicating apparatus for transmitting content as layered-encoded data to a client over a network, said communicating apparatus comprising:

an acquiring device which, if said client requests a delivery of content within a time limit, then acquires said time limit;

a priority information generation device for calculating an amount of change luminance in said content, comparing the calculated amount of change in luminance in said content to a predetermined threshold, and generating priority information based on the comparison, wherein the priority information indicating whether priority is on picture quality or on frame rate;

a determining device measuring bandwidth applicable to said client and storing the measured bandwidth in the server, and determining a layer which said content to be encoded into layer-encoded data and a frame rate at which the layer-encoded data to be transmitted to said client within said time limit, wherein the determining being based on said time limit, on the priority information, on the measured bandwidth and on size information about the layer-encoded data, wherein if said priority information indicates that priority is on picture quality, the determining comprises first determining a highest possible layer to encode said content into the layer-encoded data, then determining a highest possible frame rate to transmit the layer-encoded data, wherein if said priority information indicates that priority is on frame rate, the determining comprises first determining a highest possible frame rate to transmit the layer-encoded data, then determining a highest possible layer to encode said content into the layer-encoded data; and a transmitting device transmitting to said client said layered-encoded data at said frame rate determined by said determining device.

* * * * *